(12) United States Patent
Ghani

(10) Patent No.: US 8,938,427 B2
(45) Date of Patent: Jan. 20, 2015

(54) METHOD AND DEVICE FOR PROVIDING LOCATION BASED CONTENT DELIVERY

(75) Inventor: Rod Ghani, Scottsdale, AZ (US)

(73) Assignee: Safelite Group, Inc., Columbus, OH (US)

( * ) Notice: Subject to any disclaimer, the term of this patent is extended or adjusted under 35 U.S.C. 154(b) by 204 days.

(21) Appl. No.: 12/161,489

(22) PCT Filed: Jan. 19, 2007

(86) PCT No.: PCT/US2007/001701
§ 371 (c)(1),
(2), (4) Date: Jul. 18, 2008

(87) PCT Pub. No.: WO2007/084784
PCT Pub. Date: Jul. 26, 2007

(65) Prior Publication Data
US 2009/0049057 A1    Feb. 19, 2009

Related U.S. Application Data

(60) Provisional application No. 60/760,320, filed on Jan. 19, 2006.

(51) Int. Cl.
*G06F 17/30* (2006.01)
*G06Q 30/02* (2012.01)
*G06Q 20/20* (2012.01)

(52) U.S. Cl.
CPC .............. *G06Q 30/02* (2013.01); *G06Q 20/204* (2013.01)
USPC ........................................................ 707/640

(58) Field of Classification Search
CPC ............ G06F 11/1461; G06F 11/1464; G06F 11/1469; G06F 11/0727; G06F 11/0793; G06F 11/1402; G06F 11/1435; G06F 11/1443; G06F 11/1448; G06F 11/1451; G06F 11/1456; G06F 17/30067; G06F 2201/83
USPC ..................................... 707/10, 640; 709/228
See application file for complete search history.

(56) References Cited

U.S. PATENT DOCUMENTS

| 5,334,821 A | * | 8/1994 | Campo et al. | ................. 235/380 |
| 5,408,077 A | * | 4/1995 | Campo et al. | ................. 235/380 |
| 5,408,078 A | * | 4/1995 | Campo et al. | ................. 235/380 |
| 6,123,259 A | * | 9/2000 | Ogasawara | .................... 235/380 |

(Continued)

FOREIGN PATENT DOCUMENTS

WO    WO03036234    1/2003

*Primary Examiner* — Sheree Brown
(74) *Attorney, Agent, or Firm* — Ice Miller LLP

(57) ABSTRACT

A device for providing location based content delivery includes a server located at a first location, a hand-held electronic device configured for communication via a wireless network with the server to receive data relating to the plurality of requests for services and to transmit data regarding the provision of services for updating the data stored in the memory and a processing device communicatively coupled to the hand-held device A method for providing location based content delivery at a job site other than the location of a service provider comprises providing a technician with a hand-held electronic device, clocking the technician in and out remotely utilizing the hand-held electronic device, transferring and viewing work orders to the hand-held electronic device, capturing customer information on the hand-held electronic device at a job site and transferring it to a server accessible at the location of the service provider.

33 Claims, 35 Drawing Sheets

(56) References Cited

U.S. PATENT DOCUMENTS

| | | | |
|---|---|---|---|
| 6,138,914 A * | 10/2000 | Campo et al. | 235/472.01 |
| 6,189,789 B1 * | 2/2001 | Levine et al. | 235/383 |
| 6,234,389 B1 | 5/2001 | Valliani et al. | |
| 6,296,184 B1 * | 10/2001 | Dejaeger | 235/383 |
| 6,345,281 B1 * | 2/2002 | Kardos et al. | 700/100 |
| 6,957,185 B1 * | 10/2005 | Labaton | 704/500 |
| 6,986,145 B2 | 1/2006 | Gangopadhyay | |
| 6,986,154 B1 | 1/2006 | Price et al. | |
| 7,040,541 B2 * | 5/2006 | Swartz et al. | 235/472.02 |
| 7,063,263 B2 * | 6/2006 | Swartz et al. | 235/472.02 |
| 7,273,168 B2 * | 9/2007 | Linlor | 235/380 |
| 7,565,297 B2 * | 7/2009 | Labaton | 704/273 |
| 7,792,298 B2 * | 9/2010 | Silverbrook et al. | 380/270 |
| 2002/0107873 A1 * | 8/2002 | Winkler et al. | 707/104.1 |
| 2002/0111213 A1 * | 8/2002 | McEntee et al. | 463/42 |
| 2003/0004876 A1 * | 1/2003 | Jacobson | 705/41 |
| 2003/0100315 A1 | 5/2003 | Rankin | |
| 2003/0198188 A1 * | 10/2003 | Castlebury et al. | 370/252 |
| 2004/0141601 A1 * | 7/2004 | Cai et al. | 379/114.2 |
| 2004/0254811 A1 | 12/2004 | Horstemeyer | |
| 2004/0260470 A1 | 12/2004 | Rast | |
| 2005/0015501 A1 * | 1/2005 | Kaplan et al. | 709/228 |
| 2005/0065851 A1 | 3/2005 | Aronoff et al. | |
| 2005/0109838 A1 * | 5/2005 | Linlor | 235/380 |
| 2005/0109841 A1 | 5/2005 | Ryan et al. | |
| 2005/0120196 A1 | 6/2005 | Zito | |
| 2005/0186965 A1 | 8/2005 | Pagonis et al. | |
| 2005/0199709 A1 * | 9/2005 | Linlor | 235/380 |
| 2005/0200637 A1 | 9/2005 | Silverbrook et al. | |
| 2005/0278366 A1 | 12/2005 | Horvitz et al. | |
| 2006/0003775 A1 | 1/2006 | Bull et al. | |
| 2006/0106606 A1 * | 5/2006 | Labaton | 704/250 |

* cited by examiner

METHOD AND DEVICE FOR PROVIDING LOCATION BASED CONTENT DELIVERY

RELATED APPLICATIONS

The present application is a U.S. National Stage Application of International Patent Application Serial No. PCT/US2007/001701, filed Jan. 19, 2007, the contents of which are herein incorporated by reference, which claims priority to U.S. Provisional Patent Application Ser. No. 60/760,320, filed Jan. 19, 2006, the contents of which are herein incorporated by reference.

BACKGROUND AND SUMMARY

This disclosure relates to the field of providing location based content delivery and more particularly to providing location based content delivery wherein work is performed off-site utilizing products that are stored at centralized locations wherein the products to be utilized during the provision of location based content delivery can typically be determined in advance.

Many businesses provide services to a variety of customers who need services performed at locations other than the locations of the businesses. Often the services provided require products to be consumed during the provision of the services. One example of such a business is the auto glass installation business wherein automotive glass is installed in a customer's vehicle either at the customer's home or at some other location convenient to the customer. In the auto glass installation business, by determining the make, year and model of the automobile, any tinting options and the window which needs replaced, it can be determined in advance precisely what automotive window glass, seals and sealants may be required for servicing each vehicle.

Currently one method of providing off-site automotive glass repair and installation utilizes several steps as shown, for example, in FIGS. 28-30. Since the disclosed device and method will have the greatest impact on technician fulfillment processes, those processes implemented in the prior art will be described in some detail. As shown, for example, in FIG. 28, in the described current method of providing location based content delivery, such as auto glass replacement services, at the start of the technician's day, a technician arrives at a warehouse and clocks in for the day in step 2812. After arrival the technician receives, one or more of the following, work orders for the technician's route 2816, a preprinted technician's printed route or manifest 2814, picked and inspected parts 2818 for completing the work orders 2816. The technician then compares the work orders to the manifest in step 2820 to determine that all of the work orders 2816 are included in the manifest 2814. The technician then acknowledges that all of the parts required for completion of the work orders are included in the picked and inspected parts list in step 2822. An inventory transaction is created from the warehouse in step 2824. The parts are loaded onto the technician's truck prior to the technician leaving the warehouse in step 2826.

As shown for example in FIG. 29, after the start of the day the technician completes work orders in the existing technician fulfillment process utilizing various steps. The technician completes a customer call ahead in step 2910 utilizing a cell phone or other mobile telephone. After completing the customer call ahead the technician drives to the work order location utilizing pre-printed maps available in the technician's vehicle in step 2912. Technician calls the dispatcher utilizing their cell phone to change status of the work order to in progress in step 2914. If it is determined in step 2916 that there are new work orders then the technician returns to the warehouse as needed for parts and/or paperwork in step 2918. Otherwise, the technician continues to the work order location until they arrive at the work order location in step 2920. If it is determined in step 2922 that the vehicle requiring glass repair is available the technician then determines in step 2924 if they have the correct part or parts to perform the required service. If it is determined that either the vehicle is not available in step 2922 or that the correct part is not on the technician's vehicle in step 2924, then the technician calls the dispatcher to alert the dispatcher of the status of the work order in step 2926. If the vehicle is available and the correct part is on the technician's vehicle then the technician completes the work order in step 2928. After completing the work order the technician collects payment and signature and gathers customer information on a hard paper copy in step 2930. The technician then calls the dispatcher to change the status of the job to job complete in step 2932. After the job is completed, or after it is determined that the job cannot be completed because the vehicle is unavailable or the correct part is not on the technician's vehicle, the technician determines if there are additional work orders in step 2934. If there are additional work orders the technician returns to step 2910 and completes steps 2910 through steps 2932 for the additional work order. If there are no additional work orders then the technician begins the existing end of the day technician fulfillment process, as shown, for example, in FIG. 30.

At the end of the day the technician returns to the warehouse in step 3010 and returns unused parts to the warehouse for inspection in step 3012. At the warehouse or drop box, money and work orders are collected in step 3014. After the work orders and money are collected the CTU retail location invoices the work order and closes the work orders that are now complete in step 3016. After returning to the warehouse in step 3010 and delivering the unused parts to the warehouse in step 3012 the technician clocks out for the day in step 3018. This clocking out typically involves putting a time card into a manual time clock which time card is utilized to enter the hours worked by the technician during each day.

The current fulfillment process has several drawbacks that result in some inefficiencies. Among a few of the drawbacks of the current process are: high technician dependence on the automotive glass company's infrastructure; high administrative costs associated with technician support; and reduced process efficiency and customer service.

The high technician dependence on the automotive glass company's infrastructure is evidenced by the fact that the daily work functions of the technician require much input and involvement from various components of the automotive glass companies infrastructure. Technicians are tightly coupled with the dispatchers, central telephone units "CTUs", warehouses, and drop-boxes. This is evident in the clocking-in/clocking-out, getting route and work-orders, getting parts, changing work-order status, processing credit card payments, returning unused parts, returning payments, determining job-site location, changing routes, and addressing customer inquiries steps of the current process. Under the current process, the majority of technicians must drive to a warehouse location to clock-in and out at the beginning and end of each day. Also under the current process, at the beginning of the day, all routes and work-orders are picked up from a warehouse or drop-box. All parts are acquired from the automotive glass repair company's warehouse or drop-box. Throughout the day, technicians must call the dispatcher in order to change the status of their work-orders. This can happen as much as three times per work-order or twenty times per day per technician. In order to take a credit card payment at the job site, under the current process, the technician calls the dispatcher and provides the credit card and payment information. The dispatcher is then responsible for processing the payment. At the end of the day, all unused parts are returned to the automotive glass company's warehouse or drop-box. All payments collected at the job-sites are returned to the automotive glass company's warehouse or drop-box at the end of each day. The majority of questions regarding directions or job-site location are answered by the dispatcher via a phone call from the technician. Any route changes that occur when the technician is in route are communicated through a phone call from the dispatcher. In addition, route changes may require an extra trip to the warehouse to pick-up parts. Service related questions asked by the customer on the day of service are channeled from the customer to the technician through the dispatcher. Any return communications are returned via the same path.

Because of the tight coupling between technicians and the automotive glass company's infrastructure, administrative and support costs associated with service delivery are higher than necessary. These costs manifest themselves in both payroll and operating expense. Under the above described current process of providing automotive glass repair services, much paper is required to support the process. Among the paper work generated by such process are route manifests, check-in/check-out lists, invoices, and multiple work-orders printed for each job. Additionally, management of parts, routes, work-orders, payments, and customer inquiries creates a ratio of support personnel to technician that is overly high. The combination of payroll and operating expense required to support the automotive glass company's technicians creates a higher than desired fixed cost.

Under the above described current process of providing automotive glass repair services, there exists some reduced process efficiency and customer service. The order fulfillment process includes steps that have an overall negative impact on efficiency and customer service. While technician productivity may be high under the above described process, it is believed that there are opportunities for improvement in technician idle time, phone calls required to complete a job, trips to and from a warehouse or drop-box, work-order slippage, inventory loss, service differentiation, and invoice and work-order quality. Thus, providers of location based content delivery would appreciate a process and device that improves the currently available processes in one or more of the following ways, either alone or in combination.

Providers of location based content delivery would appreciate a process and device that reduces technician idle time by increasing the amount of time technicians spend on fulfilling orders. Providers of location based content delivery would appreciate a process and device that reduces the amount of phone calls technicians place to the dispatcher and vice-versa. Providers of location based content delivery would appreciate a process and device that reduces the amount of trips the technician takes to and from a warehouse or drop-box. Providers of location based content delivery would appreciate a process and device that allows technicians to complete a greater percentage of scheduled jobs thereby reducing work-order slippage. Providers of location based content delivery would appreciate a process and device that increase control of inventory checked-out of the warehouse. Providers of location based content delivery would appreciate a process and device that facilitate providing higher quality service in a way that differentiates their services from competitors' services. Providers of location based content delivery would appreciate a process and device that improve compliance with "Write-it-right" regulations and increase quality of customer data collected at the job site.

The method and device disclosed herein decrease technician dependence on the location based content delivery provider's distribution infrastructure, reduce administrative costs associated with technician support and increase process efficiency and customer service. In the disclosed embodiments these improvements are accomplished by implementing broad business process improvements and mobile resource management (MRM) technical solutions.

It is believed that through the use of wireless networks an increase in business agility may be realized through continuous data access and synchronization. Better business decisions may be made when information is more timely and accessible. Wireless solutions deliver customizable data exchange solutions that fit with an location based content delivery provider's mobile business model. Wireless solutions also help office-based employees manage day-to-day workflow and keep up with mobile users in real-time. MRM allows users to track their work as they complete it, whether they are selling, installing, delivering, servicing, or monitoring product delivery.

According to one aspect of the disclosure, a device for providing location based content delivery includes a server, a hand-held electronic device and a processing device. The server is located at a first location and includes memory and data stored in the memory relating to a plurality of requests for service at a location other than the first location. The hand-held electronic device is configured for communication via a wireless network with the server to receive data relating to the plurality of requests for services and to transmit data regarding the provision of services for updating the data stored in the memory. The processing device is communicatively coupled to the hand-held device.

According to another aspect of the disclosure, a method for providing location based content delivery at a job site other than the location of a service provider comprises providing a technician with a hand-held electronic device, clocking the technician in remotely utilizing the hand-held electronic device, clocking the technician out remotely utilizing the hand-held electronic device, transferring work orders to the hand-held electronic device, viewing the work orders on the hand-held electronic device, capturing customer information electronically on the hand-held electronic device at a job site and transferring captured customer information to a server accessible at the location of the service provider.

Additional features and advantages of the disclosed devices and methods will become apparent to those skilled in the art upon consideration of the following detailed description of preferred embodiments exemplifying the best mode of carrying out the invention as presently perceived.

BRIEF DESCRIPTION OF THE DRAWINGS

The illustrative devices and methods will be described hereinafter with reference to the attached drawings which are given as non-limiting examples only, in which.

DETAILED DESCRIPTION

Figure 1:
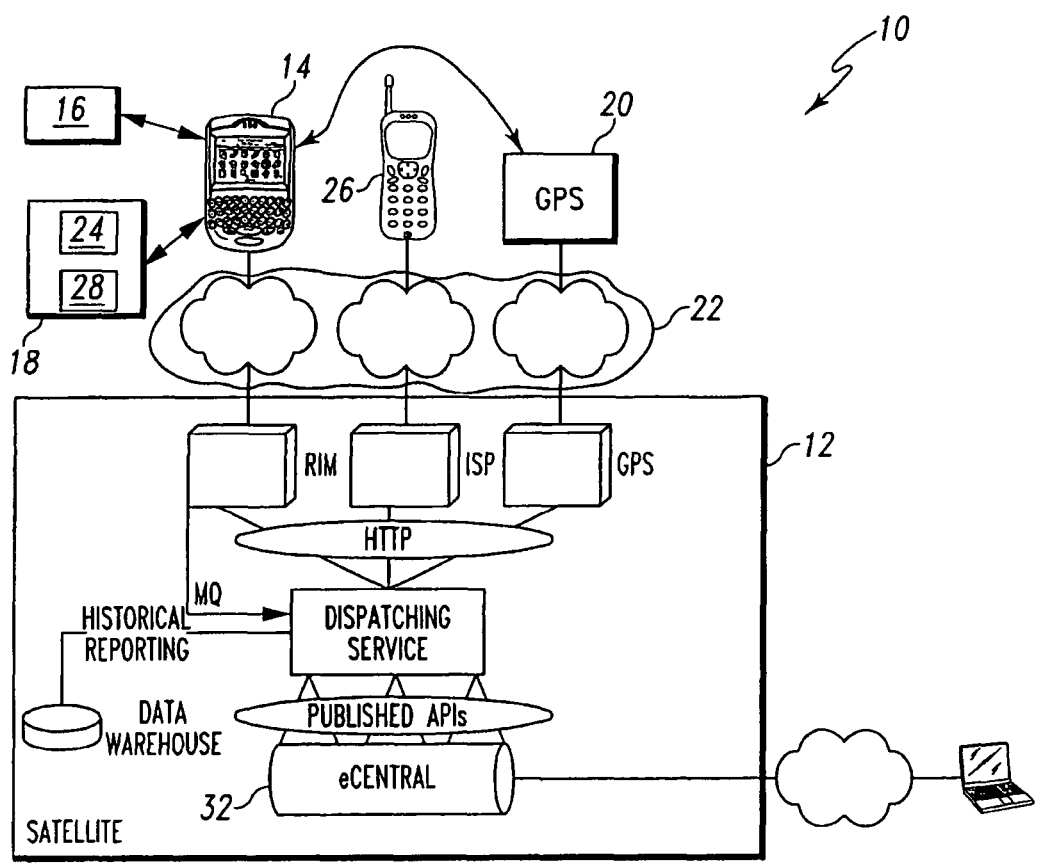
FIG. 1 is a block diagram of a device for facilitating the provision of location based content delivery services.
Figure 2:
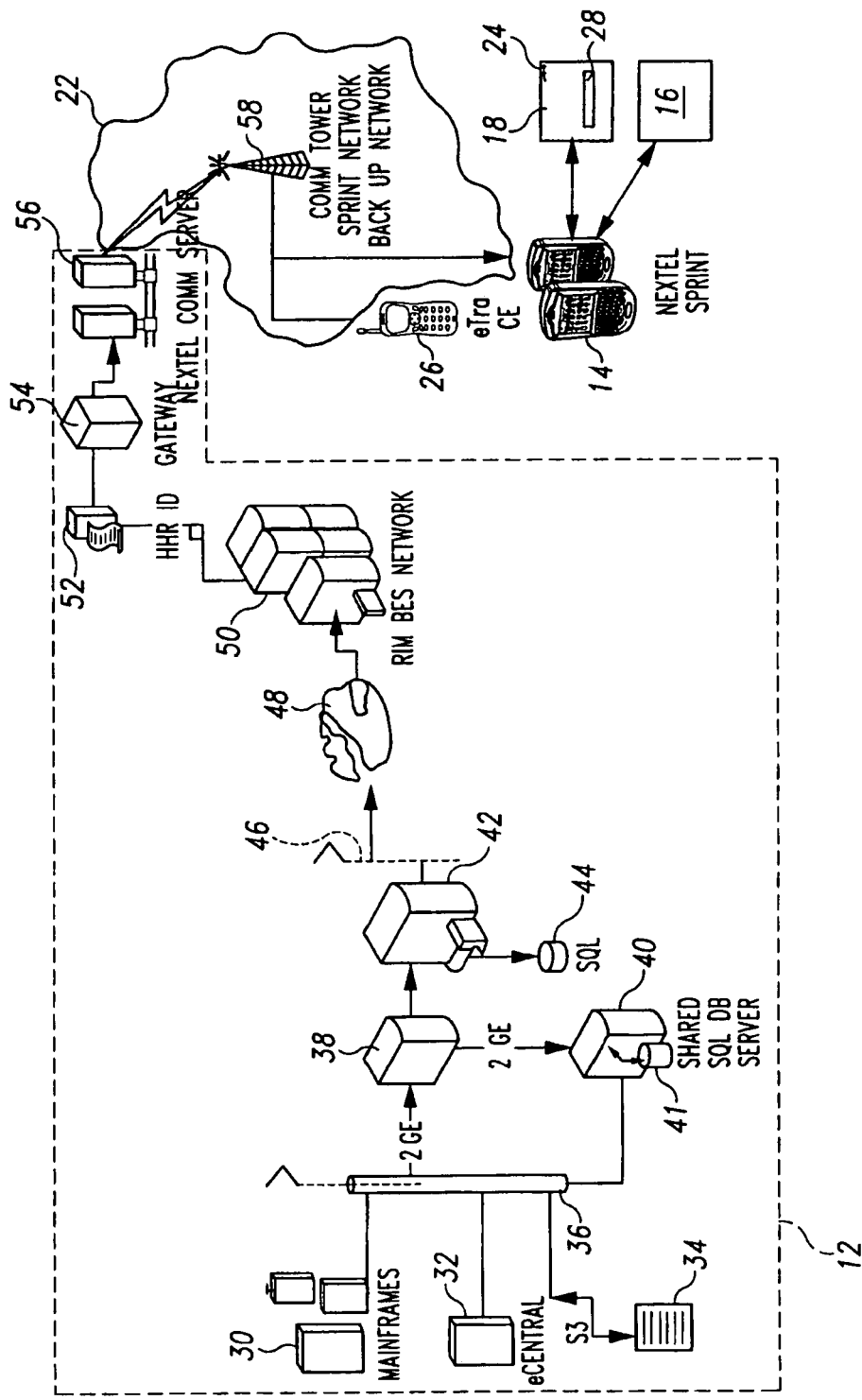
FIG. 2 is a diagram of an embodiment of a device for facilitating the provision of location based content delivery services without technician location services or turn by turn direction services.

The disclosed method and device offer improvements over the current processes implemented to provide location based content delivery wherein inventory located at centralized locations is installed or otherwise utilized at an off-site job site. While the disclosed method and device are described with reference to the provision of off-site automotive glass installation, those skilled in the art will recognize that the method and device disclosed herein can be utilized in providing other types of location based content delivery such as appliance repair and other equipment installation purposes.

The disclosed device and method improve the provision of location based content delivery in one or more of the following manners. The clock-in/clock-out process is improved by eliminating or reducing the number of phone calls and amount of travel required for a technician to clock-in and out. This is accomplished by providing the technician with a hand-held electronic device that allows the technician to clock-in and out remotely. This can result in realization of additional benefits such as reduction in fuel usage and reduction in mileage put on company owned or leased vehicles possibly resulting in extended vehicle life and/or reduced maintenance and repair costs.

Additionally, paperwork is reduced in one or more of the following ways by implementing the disclosed embodiments. Paperwork is reduced by eliminating or substantially reducing the number of printed versions of work orders. In the disclosed embodiments, the technician is allowed to view the work orders on a hand-held electronic device. Paperwork is reduced by eliminating or substantially reducing the printed Check-in/Check-out ("CICO") lists. CICO lists are generated electronically and are viewable on not only the technician's hand-held electronic device but also on devices such as computers work stations and/or hand-held electronic devices in the warehouse. Paperwork is further reduced by eliminating or substantially reducing the number of printed versions of the route manifest provided to each technician. In the disclosed embodiments, technicians are allowed to view the work order sequence on their hand-held electronic device. Work order status changes are simplified by eliminating or reducing the number of telephone calls from the technician to the dispatcher previously required to change work order status and the need to print updated work orders and manifests reflecting the changed or added information.

In the disclosed embodiments, the technician remotely updates the status of work orders through their hand-held devices on a central computer or server (occasionally referred to herein in specific examples and in the drawings related to off-site glass repair as "GTS") without travel or phone conversations. Technicians are able to obtain parts as needed from centralized inventory locations and/or alternative parts suppliers. Additionally, technicians are provided more opportunities with regard to the disposition of unused parts. The hand-held device allows dispatchers to reprioritize work orders in real-time by sending the reprioritized work order to the technician's hand held device.

In the disclosed embodiment, through the utilization of GPS or other location technology, the dispatcher is able to know the location of the technician in real-time, thereby reducing the number of phone calls between the technician and dispatcher. Additionally, the provision of location technology facilitates delivering turn by turn directions and electronic maps to the hand-held device 14 to provide directions to the technicians next worksite.

Instead of manually notating customer information, such as Vehicle Identification numbers, license numbers and mileage when services are provided on an automobile, the technician is allowed to capture this information electronically on the hand-held electronic device at the job-site. Additionally, the disclosed device facilitates electronic capture of the customers signature at the job site. With the provision of the portable printer, the technician can print necessary receipts and other required documentation at the job site for delivery to the customer. Phone calls to the dispatcher from the technician are substantially reduced by utilizing the hand-held device to process credit card payments at the job-site. The disclosed embodiments also allow the technicians the ability to invoice, record payments and make bank deposits utilizing their hand-held electronic devices.

As shown for example, in FIG. 1, the disclosed embodiment of a device 10 for providing location based content delivery includes a server 12, a hand-held electronic device 14, a signature capture device 16, a processing device 18 and a location information-receiving device 20. The device 10 may also include a separate a mobile phone 26 provided for use by the technician. In the illustrated embodiment, hand-held electronic device 14 is a personal data assistant ("PDA") device configured for wireless communication. The PDA 14 and the server 12 are each configured to communicate via a wireless communication network 22. The signature capture device 16 is communicatively coupled to or implemented by the hand-held electronic device 14. The processing device 18 is communicatively coupled to the hand-held electronic device 14. Thus, the components of the device 10 are configured to permit data to be transferred between the various devices.

In the illustrated embodiment, processing device 18 is configured to automatically capture information regarding an account represented by a credit card and to print documents. In one embodiment, the processing device 18 is configured to allow credit cards to be swiped in a credit card capture device 24 and print documentation from a printer 28. While shown as a single device 18, it is within the scope of the disclosure for processing device 18 to be implemented by a separate credit card capture device 24 and a separate printer 28 or for either or both of the credit card capture device 24 and printer 28 to be implemented by the hand-held electronic device 14.

The location information-receiving device 20 is communicatively coupled to or implemented by the PDA 14. The location information-receiving device 20, in one disclosed embodiment, is a GPS transceiver 20 configured to receive signals from and transmit signals to the global positioning satellite system. The location information is sent by the hand-held device 14 to the server 12 to permit electronic and real time monitoring of the location of the technician with which the hand-held device 14 is associated. In one embodiment of the disclosed device and method, employee information regarding the technician to which the hand-held device 14 is assigned is associated with the specific hand-held device 14 assigned to the technician. For instance, the server 12 may link the employee identification number of the technician to the MAC address ID of the hand-held electronic device 14 assigned to the technician.

In one exemplary embodiment, the PDA 14 is a Blackberry Model 7520, available from Research In Motion Limited. Those skilled in the art will realize that while a personal data assistant is described it is within the scope of the disclosure for other portable electronic communication devices to be utilized in the device 10. For example, as the memory capacity of cellular telephones increase they may exhibit the functionality required to act as hand-held electronic device 14.

While described as a single wireless communication network 22 and a single server 12, as shown, for example, in FIGS. 1, 2, 3, 7 and 8 multiple wireless communication networks and multiple servers and gateways may be utilized in the implementation of the device 10. As shown, for example in FIG. 2, the term server 12 is used broadly to encompass various network and back office components. For example, the server 12 from a development environment perspective may include computers such as mainframes 30, eCentral 32 and an S3 router 34 computer devices coupled through a network bus 36 to each other and/or to an application server 38, and/or a shared SQL database server 40 coupled to an SQL database 41. In the illustrated embodiment, the application server 38 is communicatively coupled to both the network bus 36 and the shared SQL database server 40. Illustratively, the database server 40 runs an operating system such as Windows 2000 or 2003 server operating system or Boleris The application server 38 is also communicatively coupled to the wireless communication network server 42, which in the illustrated embodiment is a Blackberry Enterprise server 42 communicatively coupled to a SQL database 44. In the illustrated embodiment, the wireless communication server 42 is coupled through a local area network 46 and network 48 to the wireless communication network server 50. Illustratively, network 48 provides bi-directional TCP communication between the wireless communication server 42 and the wireless communication network server 50. In the illustrated embodiment, the wireless communication network server 50 is the RIM BES network provided by Research In Motion Limited.

The server 12 also includes an HR ID module 52 communicative coupled between the wireless network server 50 and a gateway device 54. The gateway device 54 in the illustrated embodiment is communicatively coupled to additional gateways 56, such as those provided by a cellular telephone service, because the communication services with the hand-held device 14 are provided through the cellular telephone wireless network which includes a plurality of communication towers 58. If the communication with the wireless hand-held device 14 is not provided by a cellular telephone service provider, additional gateways 56 may not be required and wireless communication from the server 12 to the hand-held device 14 may be provided through another wireless communication network. Additionally, other wireless communication networks including proprietary wireless networks may be utilized to provide communication between the server and the hand-held device.

While the application server 38, SQL database server 40 and wireless communication network server 42 are shown as separate machines, it is within the scope of the disclosure for each of these servers to be implemented as virtual machines or otherwise implemented on a single computer. Additionally, the web server 70 (FIGS. 7 and 8) may be implemented on the same computer as the application server 38, SQL database server 40 and wireless communication network server 42. It has been found that a single computer such as and IBM x335 with dual 2.8 GHz CPUs, four GB of RAM, two mirrored 36 GB internal disk drives and two GigE network interfaces may be configured to act as web server 70, application server 38, SQL database server 40 and wireless communication network server 42. Other computers may also be utilized to implement the web server 70, application server 38, SQL database server 40 and wireless communication network server 42 within the scope of the disclosure.

Figure 3:
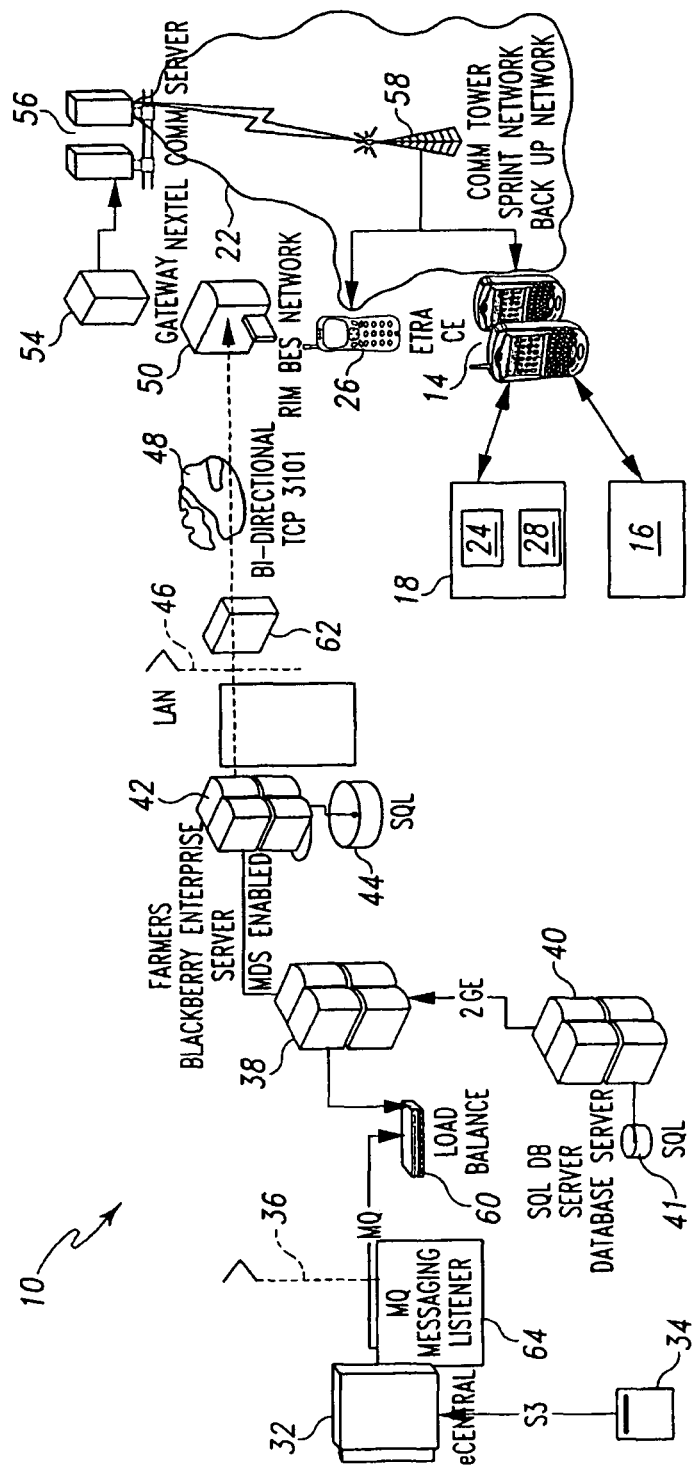
FIG. 3 is a diagram of an embodiment of a device for facilitating the provision of location based content delivery services with messaging listening and load balancing capabilities and with fire wall protection of the local area network.

As shown for example in FIG. 3, device 10 may also include one or more load balancer devices 60 communicatively coupled to the application server 38 and a firewall 62 protecting the local area network 46. Additionally, a Messaging listener 64 is coupled between the eCentral device 32 and the load balancer 60 in the communication link with the application server 38.

Figure 7:
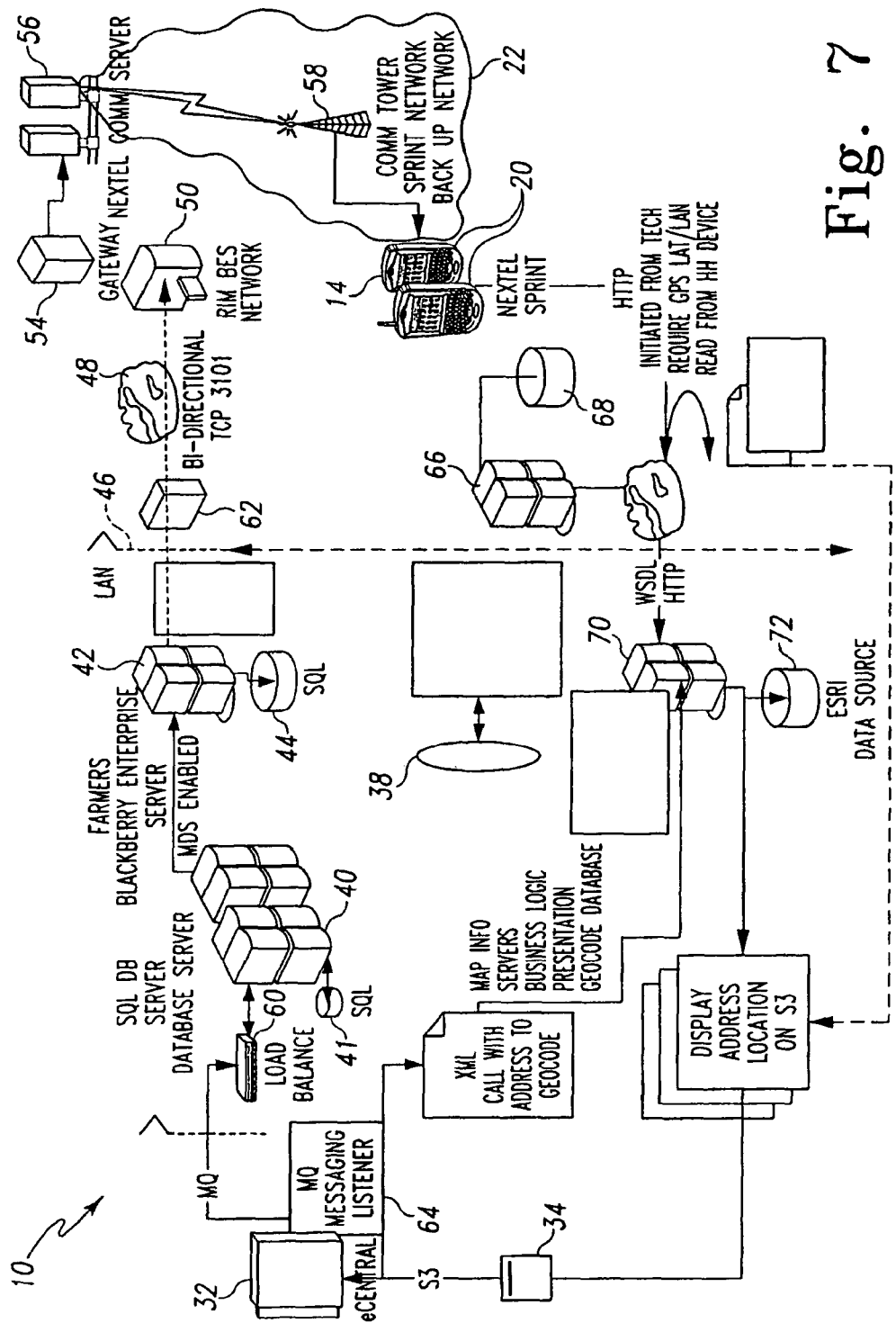
FIG. 7 is diagram of an embodiment of a device for facilitating the provision of location based content delivery services with technician location services and turn by turn direction services.

When GPS location and turn-by-turn direction functionality are provided, device 10 also includes an ASP map serves application server 66 coupled to a data source 68, as shown, for example, in FIG. 7. Additionally, device 10 includes a web server 70 coupled to an ESRI data source 72. When credit card capture is implemented in device 10, as shown for example in FIG. 8, device 10 also includes a transaction manager server 74 communicatively coupled to the web server 70 and the hand-held device 14.

In one example of the device 10, the processing device 18 is an Oneil printer Model MF 4T which is configured to interface with the PDA 14. The disclosed processing device 18 includes a built in credit card swipe slot 24 and a printer 28. The disclosed processing device 18 is blue-tooth enabled to provide communicative coupling between the processing device 18 and the hand-held device 14. Preferably, the processing device 18 is lightweight (the disclosed O'Neil printer is under five pounds), has flushable ROM and has multiple power sources which may include battery power, a DC adapter for powering the device from an automobile electrical system and an AC power source for powering the processing device from an electrical outlet.

Alternative signature capture devices 16 include a signature pad 76 or a wireless pen 78 configured to interface with the PDA. Preferably such separate signature capture devices 16 are blue-tooth enabled. Among the currently available signature capture devices 16 that may be utilized within the scope of the disclosure is the digital wireless pen 78 available from Standard Register, 600 Albany St., Dayton, Ohio, and the Siglite Bluetooth enabled pressure-sensitive electronic signature pad 76 available from Topaz Systems, Inc., 650 Cochran Street, Unit 6, Simi Valley, Calif., 93065. Additionally, it is within the scope of the disclosure for the hand-held device 14 to be configured to include a signature capture device 16, although that feature is not available on the BlackBerry 7520.

In one illustrated embodiment, utilizing a Topaz signature pad as the signature capture device and a Blackberry 7520 as the hand-held device 14, the hand-held device 14 runs a J2ME application to facilitate capturing signature data provided by the signature capture device 16. IN such embodiment, RIM's Bluetooth API is utilized to establish a Bluetooth connection between the hand-held device 14 and the signature capture device 16. The J2ME application listens on a specific port for incoming signature data from the signature capture device 16 and retrieves such signature data when it is present utilizing the Java library associated with the Topaz Signing pad 76. Upon receiving the signature data, the hand-held device 14 displays the captured signature on the screen of the hand-held device 14. The hand-held device 14 captures the signature data as a set of coordinates which can be converted to any popular graphics format for storage and wireless transfer to the server 12. In one illustrated embodiment, the signature data is captured in scalable vector graphics format.

The BlackBerry 7520 hand-held electronic device 14 disclosed in one embodiment of the device 10 includes a color screen, a user input device, illustratively an integrated keyboard, and includes global positioning satellite functionality and is Bluetooth enabled. The communication service to the disclosed hand-held device 14 is covered under a cell phone plan although it is within the scope of the disclosure for the communication service to be provided under some other plan. The disclosed PDA 14 is configured to integrate with common business software products such as software products provided by Microsoft, Inc. including but not limited to Outlook and Office Products such as Word, Excel, Access and Outlook. It is within the scope of the disclosure for the PDA 14 to integrate with other or additional business software products. The BlackBerry 7520 Wireless Hand-held provides Email, phone, browser, SMS, a GPS transceiver 20 and organizer applications in a single, integrated hand-held. The 7520 series is fully compatible with all version of the BlackBerry Enterprise Server as well as many POP3, IMAP and Webmail accounts.

Figure 4:
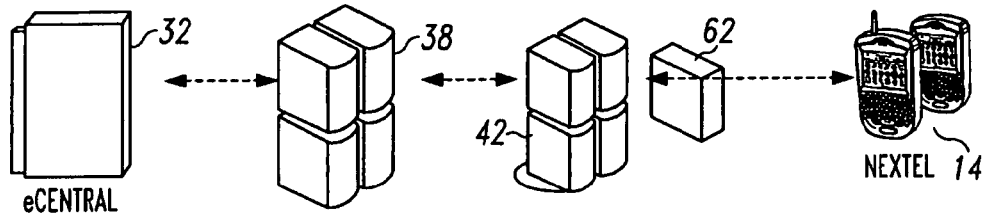
FIG. 4 is a simplified block diagram of some of the major components of device including the eCentral device, the application server, the wireless network Server, the firewall and the hand-held device.
Figure 5:
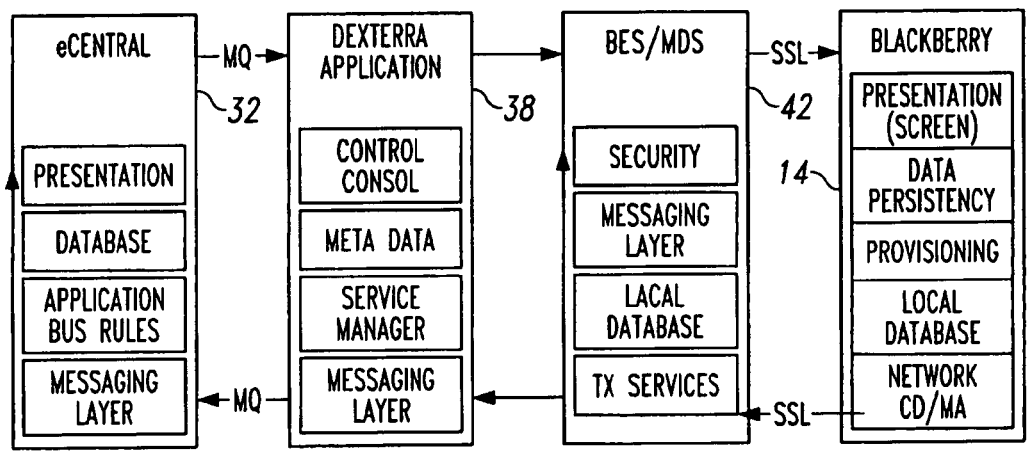
FIG. 5 is a logical layer diagram of the simplified block diagram of FIG. 4.

As shown, for example, in FIGS. 4 and 5, the eCentral computer 32 includes a presentation layer, a database layer, an application bus rules layer and a messaging layer. The eCentral computer 32 communicates through MQ protocol with the Dexterra application server 38. The Dexterra application server 38 includes a control consol layer, a metadata layer, a service manager layer and a messenger layer. The Dexterra application server 38 communicates with the wireless network server 42. The wireless server network 42 includes a security layer, a messaging layer, a local database, and transmission services. The wireless network server 42 communicates through SSL protocol with the BlackBerry hand-held device 14. The hand-held device 14 includes a presentation layer through the screen, a data persistency layer, a provisioning layer, a local database, and a network CDMA.

Figure 6:
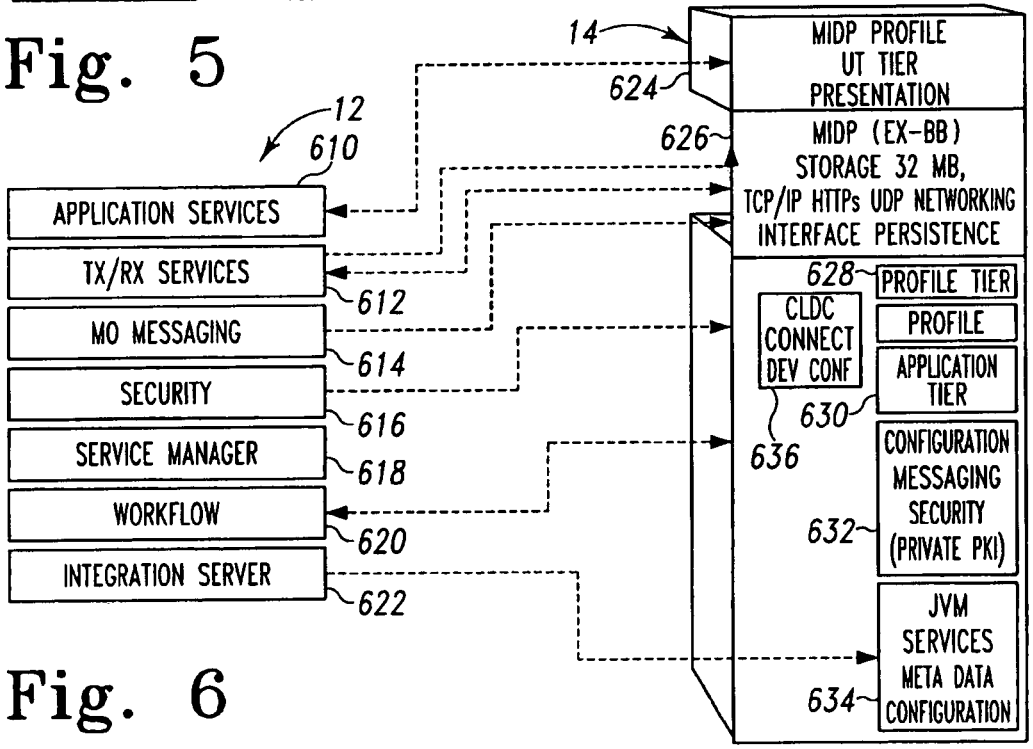
FIG. 6 is a logical layer diagram of the simplified block diagram of FIG. 4.
Figure 11:
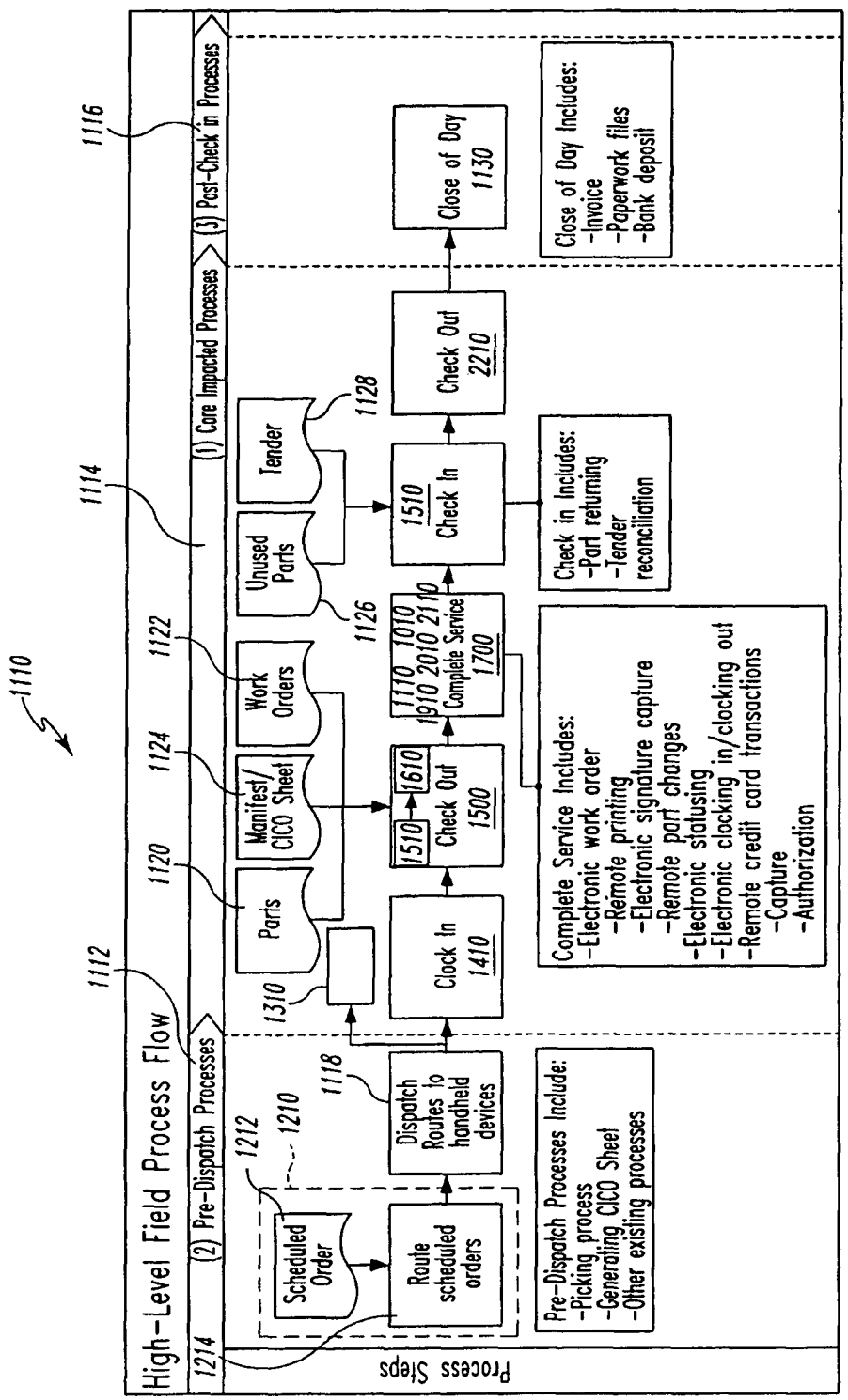
FIG. 11 is a high level process flow diagram of a method for providing location based content delivery services.

As shown, for example, in FIG. 6, the server 12 includes applications for services 610, transmission and reception services 612, MQ messaging 614, security 616, a server manager 618, work flow manager 620, and an integration server 622. The hand-held electronic device 14 includes a MIDP profile UI tier presentation 624, an MIDP (ex-BB) TCP IP HTTP UDP networking interface persistence 626, a profile tier 628, a profile application tier 630, a configuration messaging security tier 632 and JBM services metadata configuration tier 634 and a CLDC connect device configuration tier 636. The application layer 610 of the server 12 communicates with the MIDP profile UI tier presentation layer 624 of the hand-held device 14. The transmit and receive services layer of the server communicates with the MIDP (ex-BB) TCP IP HTTP UDP networking interface persistence layer 626 of the hand-held device 14. The MQ messaging layer 614 of server 12 also communicates with the MIDP (ex-BB) TCP/IP HTTPS UDP networking interface persistence layer 626 of the BlackBerry device. The security layer 616 of the server 12 communicates with the CLDC connect device configuration layer 636 of the BlackBerry device 14. The work flow layer 620 of the server communicates with the CLDC connect device configuration layer 636 of the BlackBerry device 14. The integration server layer 622 of the server communicates with the JVM services metadata configuration layer 634 of the BlackBerry device 14. This communication will be better understood as the description of the device 10 for providing turn-by-turn directions and GPS location shown in FIG. 7 and for providing credit card capture as shown in FIG. 8 as well as the method of providing location-based content delivery with regard to an auto glass replacement service as shown in FIG. 11 are explained.

As shown, for example, in FIG. 7, the device 10 for providing location-based content delivery is configured to provide the dispatcher with GPS location information regarding the location of the technician who is in possession of the hand-held device 14 and to provide the technician with turn-by-turn directions. In the illustrated embodiment, the hand-held device 14 is GPS-enabled and includes the GPS transceiver device 20. The hand-held device 14, in one embodiment is configured to send real-time date and time stamped GPS latitudinal and longitudinal information to the web server 70 of the server 12. In one embodiment, the hand-held device 14 is configured to send the GPS latitudinal and longitudinal information to the web server 70 once every minute. Those skilled in the art will recognize that GPS latitudinal and longitudinal information can be sent on the hand-held device 14 more or less frequently as desired by the location-based content delivery service within the scope of the disclosure. The hand-held device 14 is configured to send an HTTP message containing the GPS latitudinal and longitudinal information to both the ASP map serves application server 66 and the web server 70. The ASP map service application server 66 is configured as a web server but can generate JAVA VM (JRE JDK) HTTP post protocol messages through a servlet API, a servlet engine and an ESRI database. Similarly, the web server 70 is configured to generate a JAVA VM (JRE-JDK) X and L content in queue messaging utilizing a servlet engine and an ESRI database. The web server 70 provides web services which include a JAVA connector, a servlet connector, a cold fusion connector, and active ex-connector and a .NET link connector. The web server 70 communicates with the application server 38.

The ASP map service application server creates a HTTP post message which displays the address location of the technician on the S3 router. The web server 70 generates an XML call with address to the GOGEOCODE database. This XML message is sent to the eCentral service 32 and the presence of the message is detected by the MQ messaging listener 64. The server 12 is configured to use Baan service to provide turn-by-turn directions that are displayed on the hand-held device 14. The GPS latitudinal and longitudinal coordinates read from the hand-held device 14 enable the Baan service server to provide turn-by-turn directions to be displayed on the hand-held device 14. The BlackBerry device is configured so that upon the technician launching the mobile resource management application, the GPS device 20 begins to track their location. GPS events are captured with a date and time stamp throughout the day. Among the occurrences when GPS data and time stamps are recorded are clock-in, clock-out, arrival at job sites and completion of a job task.

Figure 8:
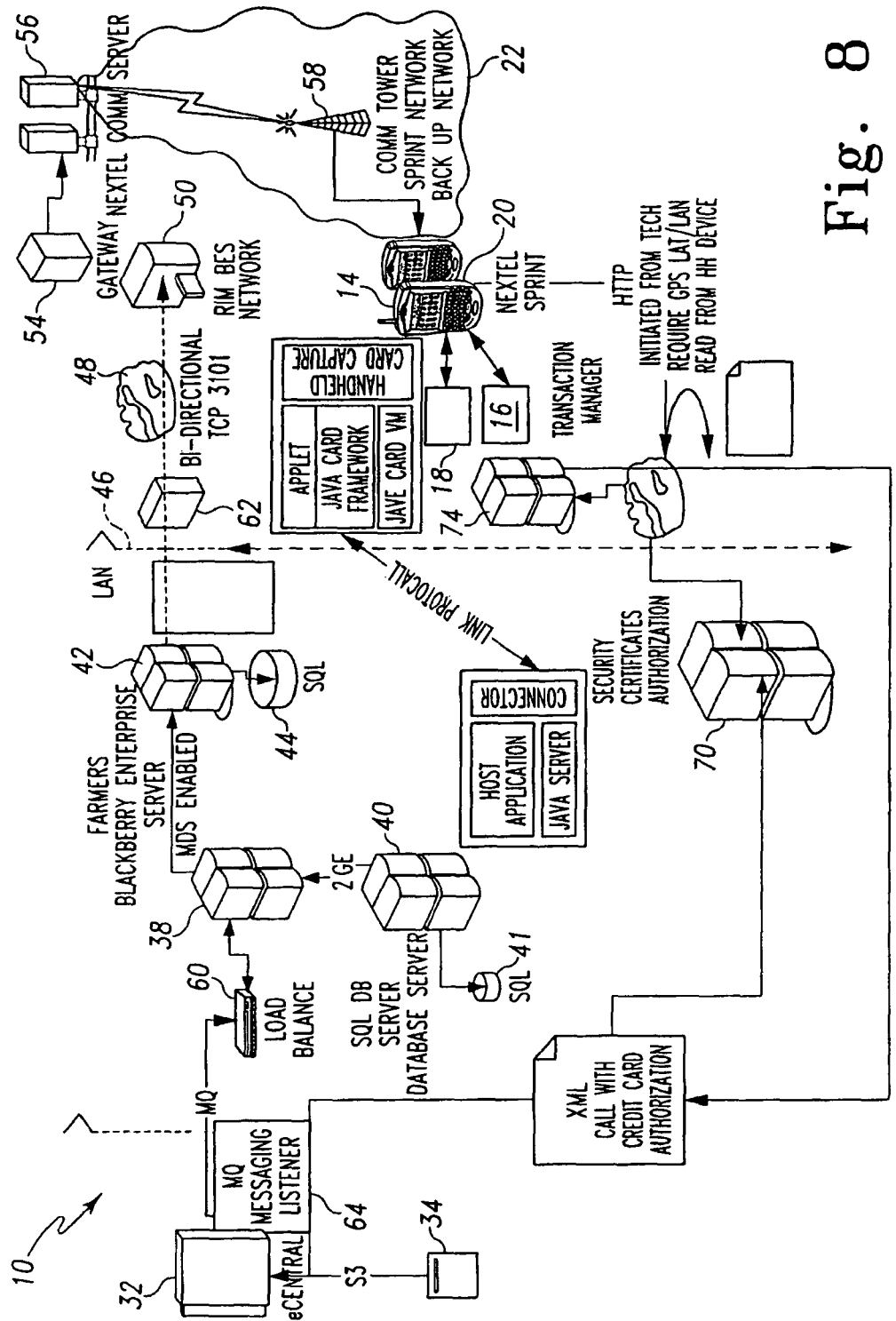
FIG. 8 is diagram of an embodiment of a device for facilitating the provision of location based content delivery services with off-site credit card capture.

As shown, for example, in FIG. 8, the device 10 allows a technician to capture credit card information and a customer's signature at the job site and receive credit card authorization while still at the job site. Upon completion of the work order, the technician, typically after printing out an invoice, can accept payment in several fashions including cash payments, check payments and credit card payments. When the customer elects to use a credit card to pay for the invoice, the technician swipes the credit card in the credit card slot of the processing apparatus 18. The processing apparatus 18 communicates the information obtained from the magnetic strip on the credit card to the hand-held device 14. The hand-held device 14 then places an HTTP call to both the transaction manager's server 74 and the web server 70. The processing device 18 is equipped with an applet, a JAVA card framework and a JAVA card BM so that the appropriate link protocol can be established between the processing device 18, the hand-held device 14 and the transaction manager server 74 and web server 70. The web server 70 includes a connector for receiving wireless communication through HTTP protocol from the hand-held device 14 and a host application and JAVA servlet for receiving credit card information. The transaction manager 74 includes similar connectors, applications and servlets so that the transaction manager server 74 can communicate with the hand-held device 14. The transaction manager server 74 queries a database to determine whether credit card payment should be authorized and then generates a credit card authorization document that is communicated in extended mark-up language ("XML") format to the web server 70 and the eCentral device 32. The server 12 then communicates via the wireless network 22 with the hand-held device to advise the technician that credit card payment has been authorized. When a signature is required for credit card authorization, the signature capture device 16 is utilized to obtain an electronic copy of the cardholder's signature which is transferred in scalable vector graphics, bitmap or some other image file form to the hand-held device 14 which communicates with the transaction manager server 74 as described above to obtain authorization.

Figure 9:
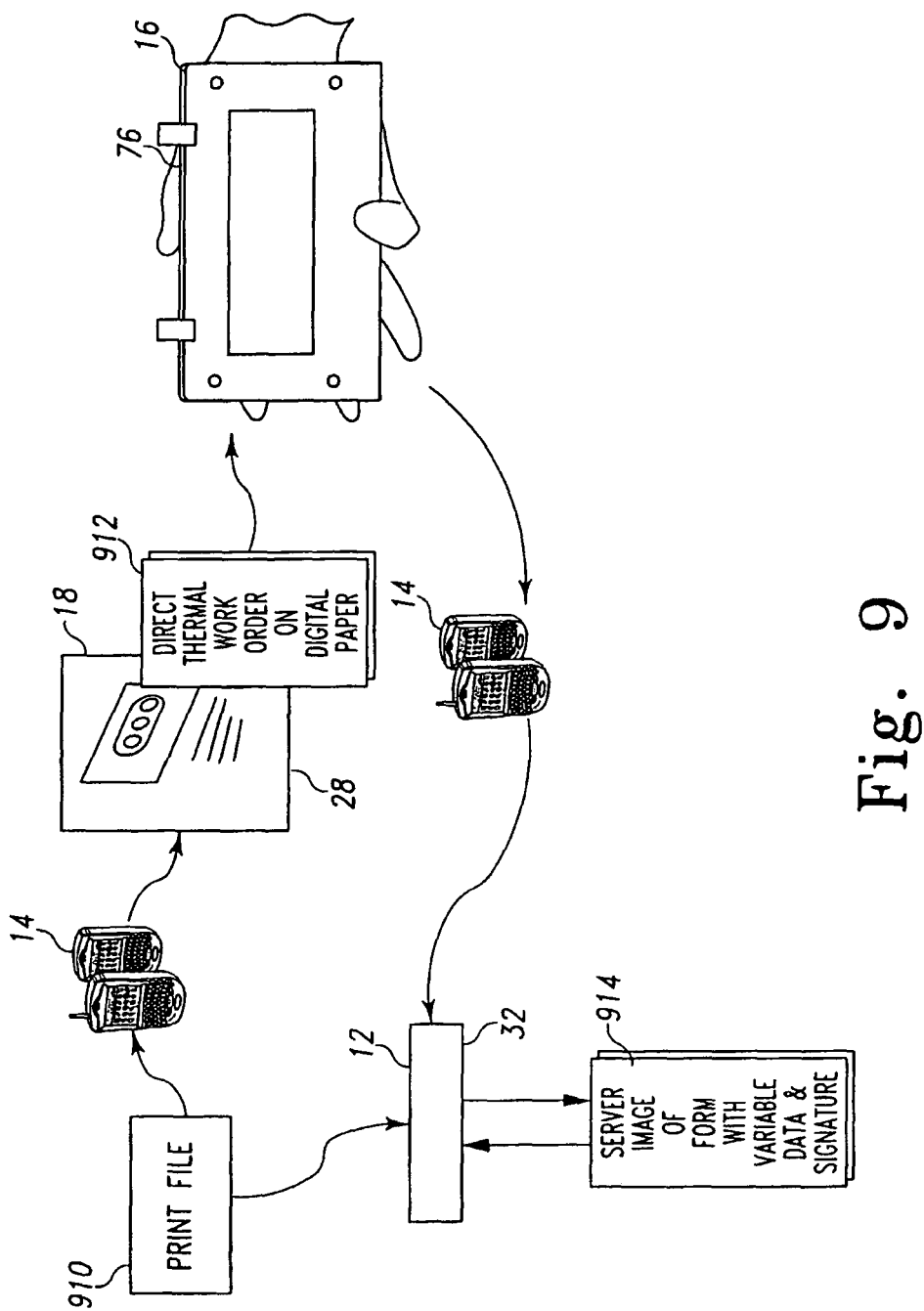
FIG. 9 is a diagram of an embodiment of the device for facilitating the provision of location based content delivery services utilizing a signature capture pad.
Figure 10:
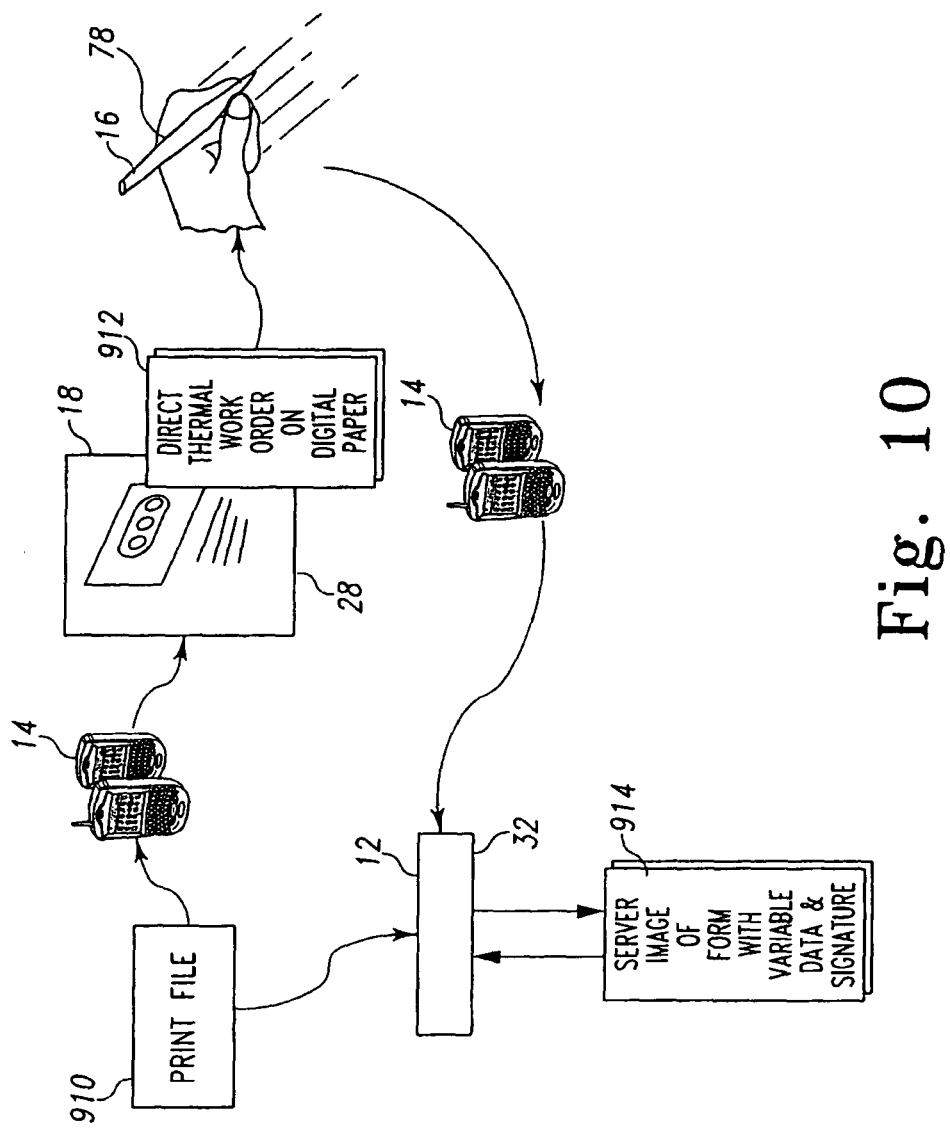
FIG. 10 is a diagram of an embodiment of the device for facilitating the provision of location based content delivery services utilizing a signature capture digital pen.

As shown, for example, in FIGS. 9 and 10, the signature capture device 16 in one embodiment is a blue tooth enabled signature capture pad 76 (FIG. 9) and in a second embodiment is a blue tooth enabled digital pen 78 (FIG. 10). The signature capture device 16 may be utilized not only for submitting a signature for credit card authorization as described with regard to FIG. 8, but also to obtain a customer's signature on a direct or thermal work order and/or invoice printed on the printer of the processing device 18. The main computer 32 of the server 12 includes print files 910 which may be communicated to the hand-held device 14 each time a document is to be printed or a single time and stored on the memory of the hand-held device 14. This print files are editable on the hand-held device 14 so that changes to the work order or invoice may be made by the technician at the job site.

Once the desired work order or invoice is ready for printing, the hand-held device 14 digitally communicates a print file to the printer 28 of the processing device 18. The printer 28 of the processing device 18 then generates a hard copy 912 of the desired work order or invoice on digital paper. When the signature capture pad 76 is utilized to obtain the customer's signature, as shown, for example, in FIG. 9, the hard copy work order on digital paper 912 is placed in the signature capture pad 76 so that the signature line is below the signature location on the signature capture pad 76. The signature is then captured by the signature capture pad 76 and placed in scalable vector graphics, bitmap or other image format When a digital pen 78 is used to capture the signature of the customer, as shown, for example, in FIG. 10, the hard copy of the work order on digital paper is provided to the customer along with the digital pen 78. The digital pen 78 is in communication with the hand-held device 14 and communicates scalable vector graphics, bitmap or other image file of the signature to hand-held device 14, similar to the manner in which the signature capture pad 76 communicates the scalable vector graphics, bitmap or other image file of the signature to a hand-held device 14.

Regardless of which device captures the signature and transmits it to the hand-held device 14, the hand-held device 14 wirelessly transfers the image of the printed form (e.g. a work order or invoice) along with any variable data and/or signature added to the form and captured by the signature capture device 16. This information is wirelessly transferred to the central computer 32 of the server 12 which generates and stores a server image of the form with variable data and signature 914.

In one embodiment of signature capture using a signature capture device 16 print-ready work orders are downloaded to each technician's hand-held device 14 on a daily basis utilizing a wireless network. That same work order file is downloaded to the main computer 32 of the server 12 and stored thereon. The technician electronically receives a work order for each job order in a generated task list for the day. The technician then prints each work order individually at each job site utilizing the processing device 18 rather than receiving a batch of pre-printed work orders every morning. Once the customer's signature is captured with the signature capture device 16, the signature capture device 16 transmits an image of the signature to the hand-held device 14. The hand-held device 14 transmits the image of the signature to the central computer 32 of the server. The signature is matched to the appropriate work order downloaded earlier in print file format to the central computer of the server 12. Central computer 32 then generates an image of the form with variable data and signature 914. This server image of the form with variable data and signature 914 is then stored on the central computer of the server 12 and is available for viewing or printing as needed. In one embodiment, the central computer 32 on the server 12 runs EXPEDATA service which facilitates the generation and modification of the print files and the server image of the form with variable data and signature 914. Those skilled in the art will recognize that other software may be running on the central computer 32 of the server 12 to facilitate generation of print files 910 and server image files of forms with variable data and signatures 914.

The method for providing location-based content delivery 1110 is shown, for example, in FIGS. 11 through 25. Referring now to FIG. 11, from a high level field process flow perspective, the method of providing location-based content delivery 1110 may be subdivided into pre-dispatch processes 1112, core impact processes 1114 and post check-in processes 1116. Among the pre-dispatch processes 1112 are routing 1210 which includes scheduling orders 1212 and routing scheduling orders 1214. After the routing step 1210 is accomplished the routes are dispatched to hand-held devices 1118. While not specifically represented by the high level process flow diagram, the pre-dispatch processes 1112 include the picking process wherein parts required for completion of the order are removed from inventory and prepared for loading onto a technician's vehicle, generating check-in/check-out ("CICO") sheets and other existing processes carried out by the location-based content delivery service provider.

After the routes are dispatched to hand-held devices 14 they may be viewed at any time during the core impacted processes 1114 and thus are routed to hand-held devices 14 prior to the log-in step 1310 or the clock-in step 1410. When a technician starts his workday, he performs a log-in step 1310 on the hand-held device 14 to access the information wirelessly communicated to the hand-held device 14. Following log-in 1310, the technician may perform a clock-in step 1410.

Following clock-in step 1410, the technician performs the checkout step 1500 which includes a check-in step 1510 and a checkout for current day process 1610. During the checkout step 1500 parts 1120 that were picked during the pre-dispatch process 1112 in order to fulfill the work orders 1122 that were routed to the hand-held device 14 are provided to the technician. Also, the manifest and check-in/check-out sheet are provided to the technician so that he can perform the various checkout steps 1500. Following checkout 1500, the technician performs the complete service step 1700.

In performing the complete service step 1700 the technician performs the technician call aheads 1710, the complete service process 1810, the part confirmation process 1910, the tendering process 2010 and the end of route process 2110. During the complete service step 1700, electronic work orders are remotely printed, electronic signatures are captured and remote part changes are designated. Also, the technician electronically changes the status of work orders, performs electronic clocking-in and clocking-out (such as during a lunch break) and performs remote credit card transactions by capturing credit card information and obtaining authorization while still at the job site. Upon completion of service step 1700, the check-in step 1510 is performed. During the check-in step 1510, unused parts 1126 are returned to a warehouse or a drop box and cash and check payments are tendered in step 1128. Following check-in, the clock-out step 2210 is performed.

Figure 23:
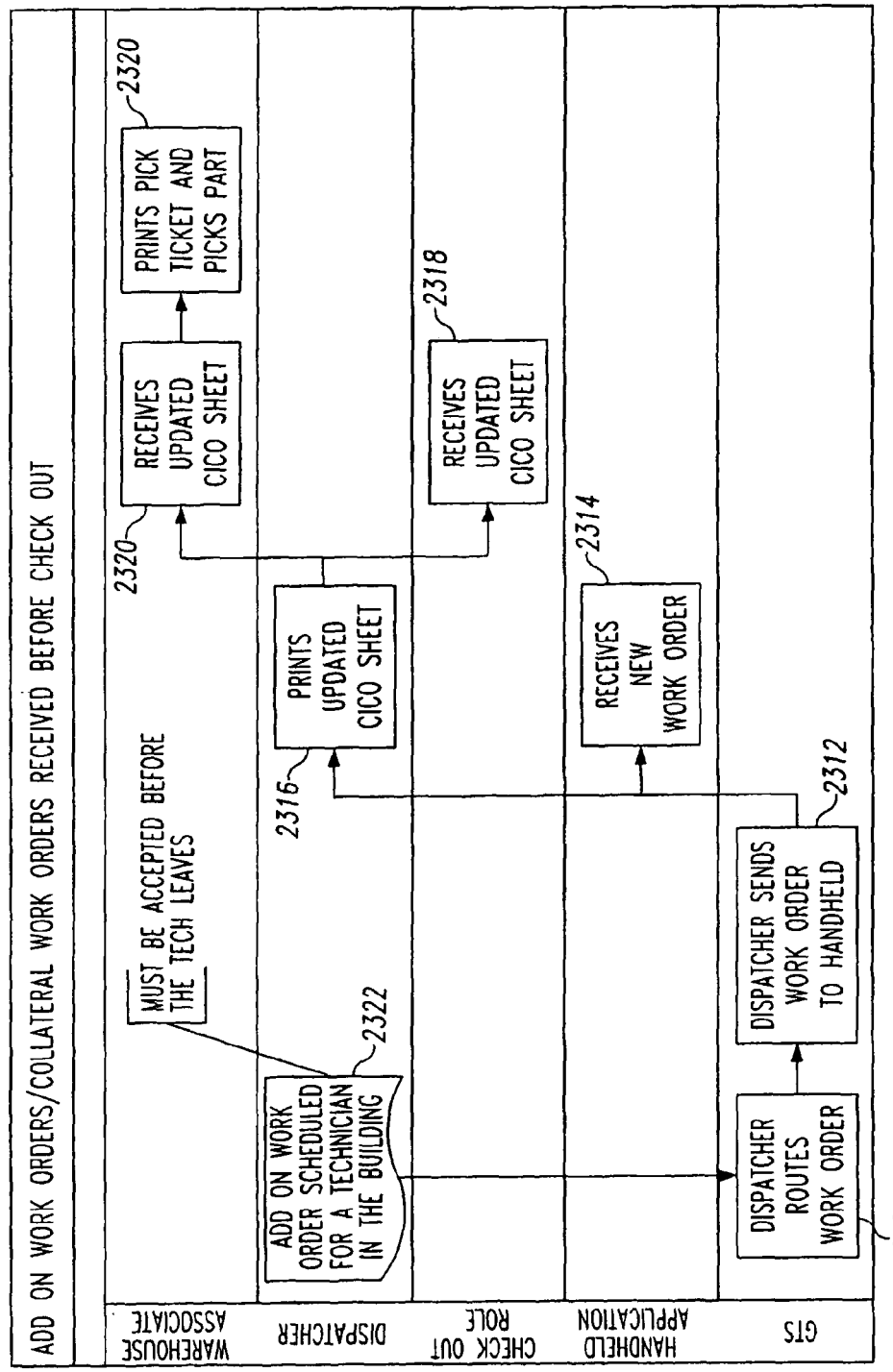
FIG. 23 is a flow diagram of a step for adding a work order before a technician performs the check-out step of the method for providing location based content delivery services of FIG. 11.
Figure 24:
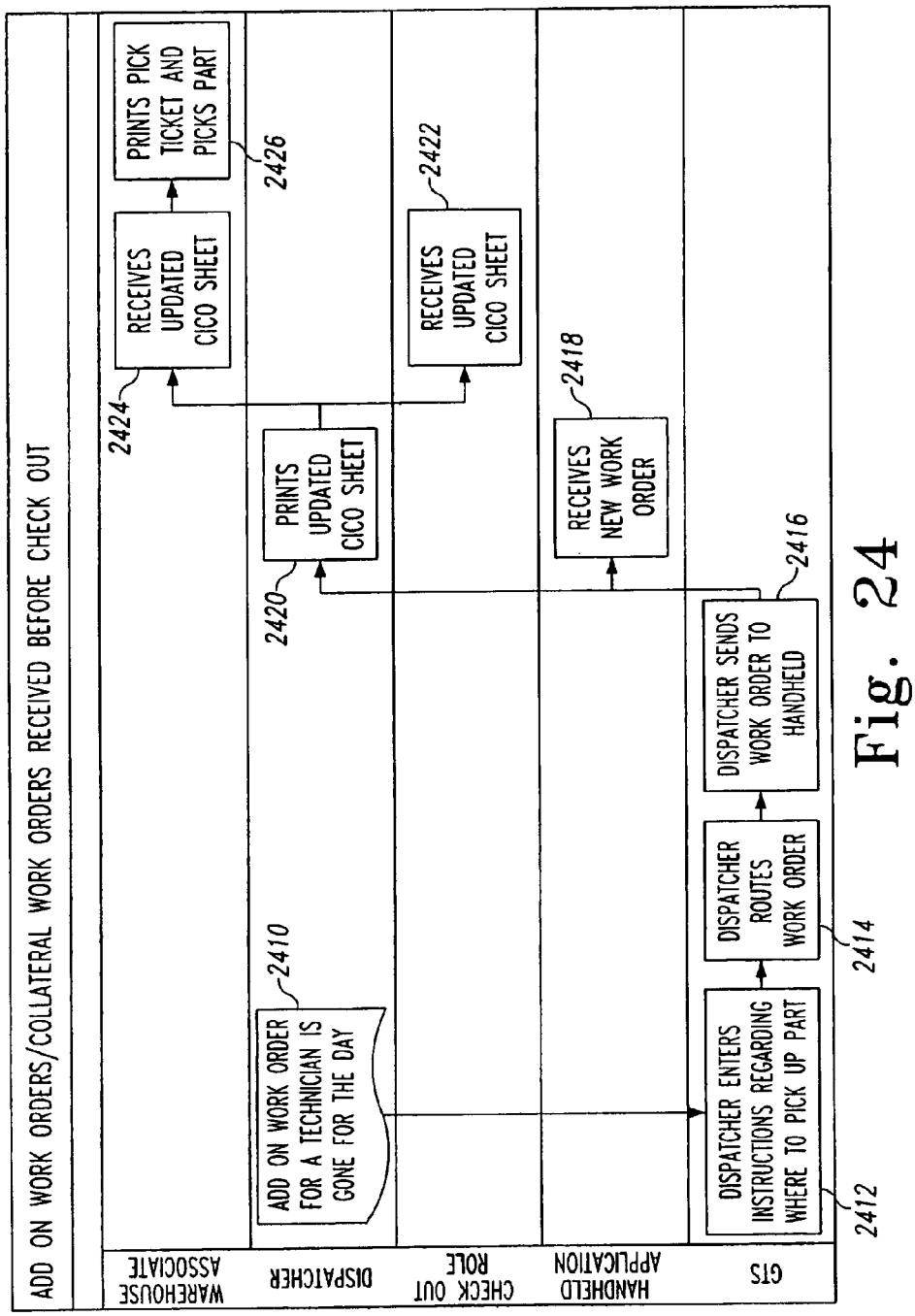
FIG. 24 is a flow diagram of a step for adding a work order after a technician performs the check-out step of the method for providing location based content delivery services of FIG. 11.

Because work orders are not pre-printed and given to the technician at the time he departs the warehouse or drop box of the location-based content delivery service provider, at any time during the core impacted processes 1114 add-on or collateral work orders can be sent to the hand-held device 14. FIG. 23 represents an add-on work order or collateral work order received before check-out while FIG. 24 represents process flow when an add-on work order or collateral work order is received after check-out. Upon completion of the core impacted processes 1114, the post check-in processes 1116 are performed. The post check-in processes 1116 include a close of day step 1130. Close of day step 1130 includes reconciling invoices, paper work in files and making bank deposits, among other processes.

Some of the main steps in the high level field process flow 1110 will be explained in further detail in the following descriptions regarding FIGS. 12 through 24.

Figure 12:
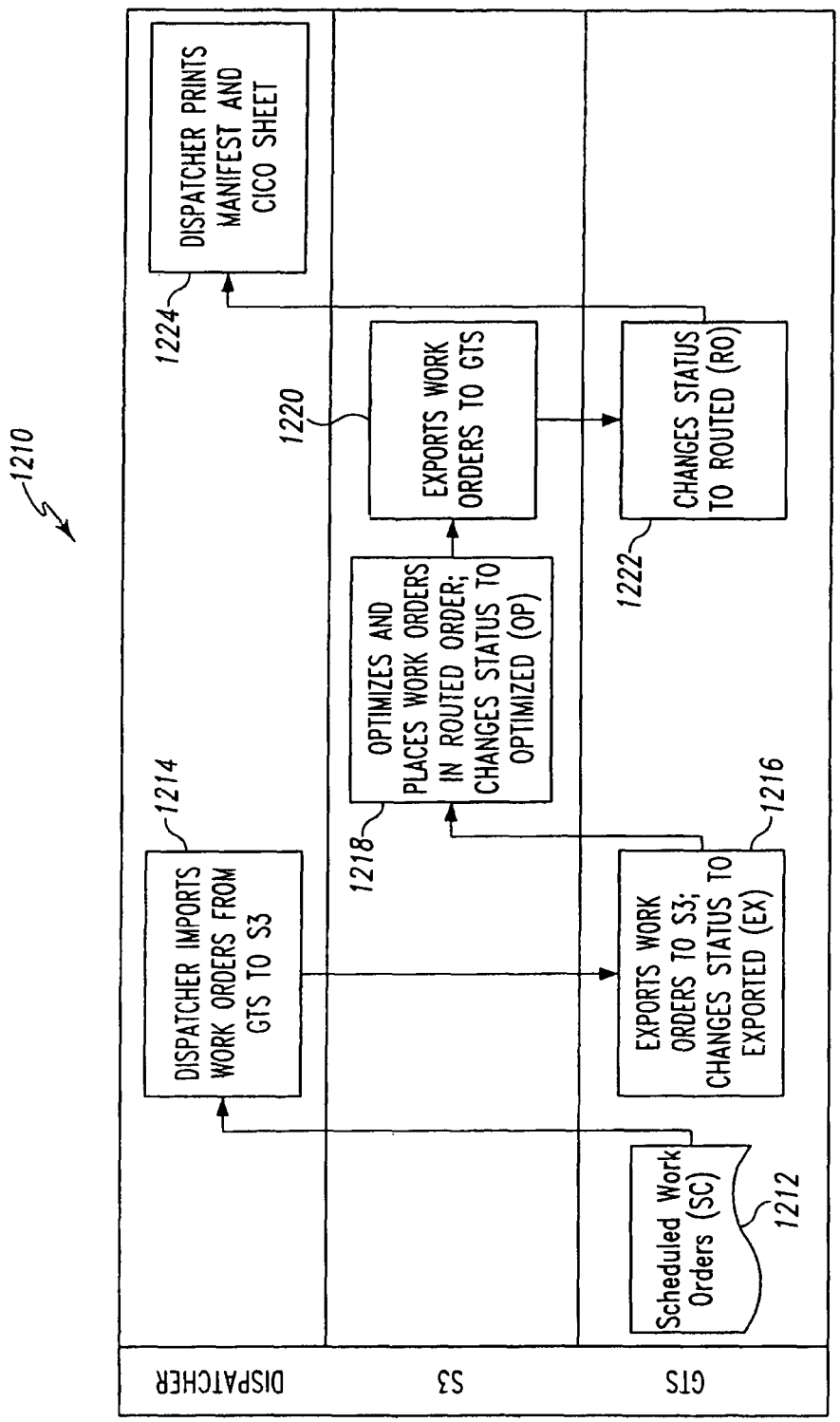
FIG. 12 is a flow diagram of a routing step of the method for providing location based content delivery services of FIG. 11.
Figure 13:
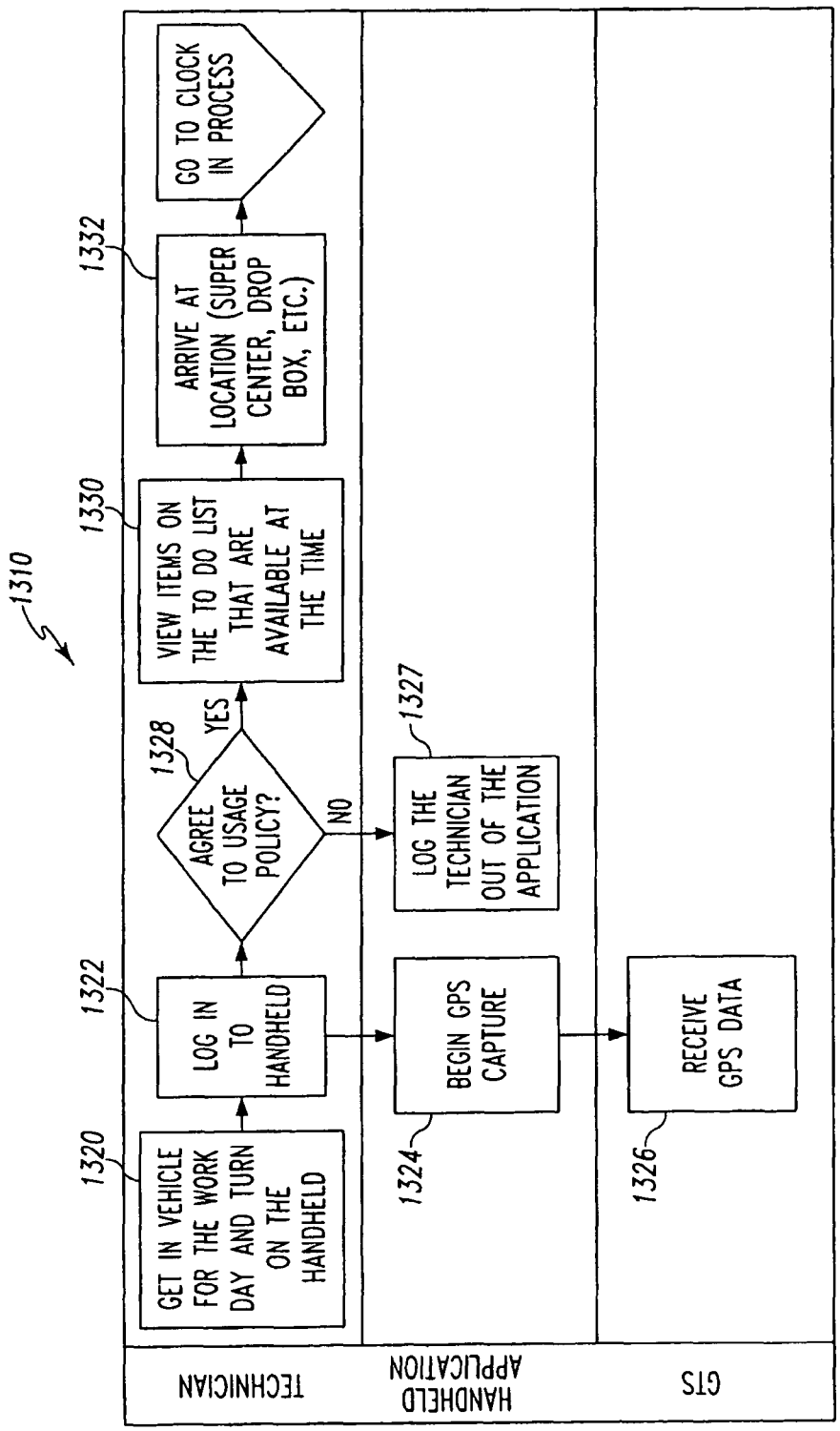
FIG. 13 is a flow diagram of a log-in process step of the method for providing location based content delivery services of FIG. 11.
Figure 14:
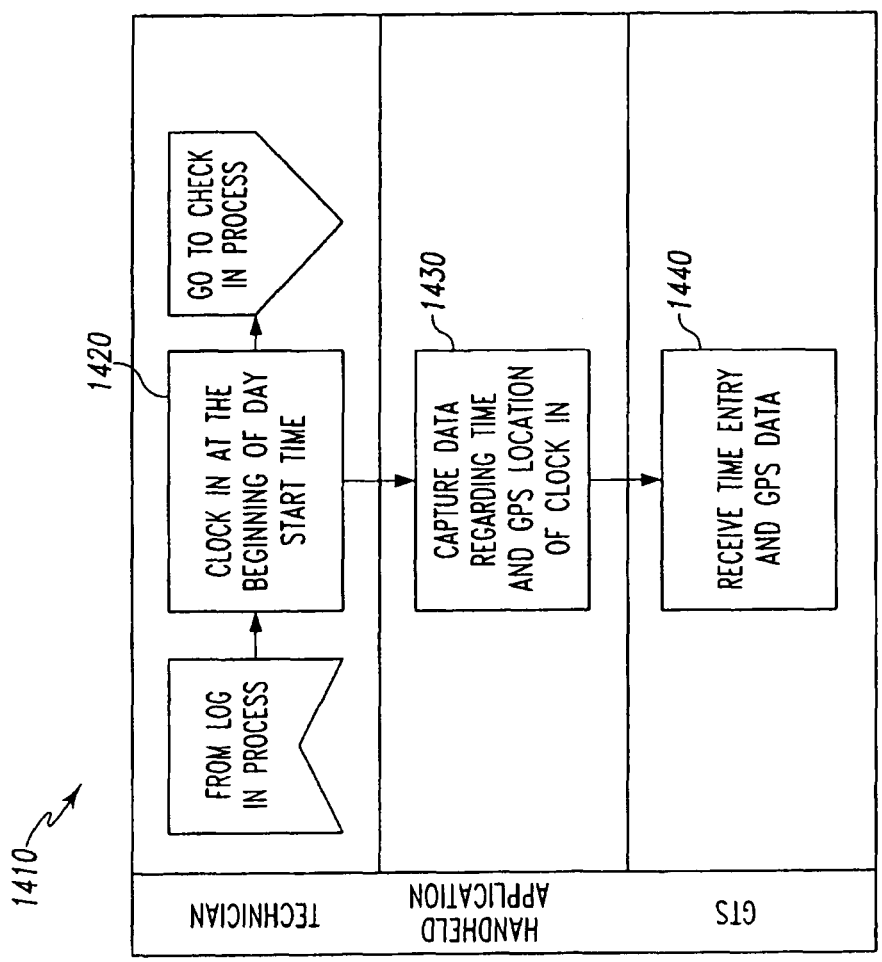
FIG. 14 is a flow diagram of a clock-in process step of the method for providing location based content delivery services of FIG. 11.

As shown, for example, in FIG. 12, the routing step 1210 includes a scheduled work order step 1212. In a specific embodiment of the method of providing location-based content delivery 1110, related to the provision of auto glass replacement and repair services, the scheduled work orders step 1212 is accomplished by a sales representative or dispatcher entering information regarding the customer, the vehicle type, any insurance coverage, the auto glass that has been damaged, and the location, date and requested time when the service should be performed into a main computer such as eCentral 32 or the application server 38 of the server 12. This dispatcher then imports the work orders from the central computer (indicated by the initials "GTS" in the drawings) to the router 34 (indicated by the symbol "S3") in step 1214. The GTS then exports work orders to the router 34 and changes the status of the work order to exported in step 1216. The router 34 then optimizes and places work orders in routed order and changes the status of the work order to optimized in step 1218. The router 34 then exports the work orders to the technology system in step 1220. The technology system changes the status of the work order to routed in step 1222. The dispatcher accessing the technology system then, if necessary, prints manifest and check-in/check-out sheets in step 1224. Thus, work order manifests including a list of work orders are created for each technician which are stored in the technology system. Alternatively, if a router 34 is not available to automatically optimize the distribution of work orders to create routes for the various technicians, scheduled work orders may be sent to the dispatcher who can use cut and drop in the technology system to manually route work orders and then automatically create a manifest for each driver.

Following the routing step, as shown, for example, in FIG. 11, a manifest including the list of work orders to be carried out by each technician is electronically dispatched to the appropriate technician's hand-held device 14 in step 1118. Thus, the manifest for each technician is available for viewing on the hand-held device 14 following the log-in step 1310 and throughout the core impacted processes 1114. Although shown in FIG. 11 as occurring only once during the day prior to clock-in, the log-in step 1310 may be performed at any time throughout the day should the technician not wish to leave the mobile resource management program running. Thus, the technician will log-in to the hand-held device and the mobile resource management software each time he gets into the vehicle during the day including prior to clock-in so that he can track the use of company property at all times. Thus, in step 1320 the technician gets into the vehicle for the work day and turns on the hand-held 14 as shown, for example, in FIG. 13.

The technician then logs into the hand-held in step 1322. Log-in step 1322 may include entry of a password associated with the technician. Once a technician has logged into the hand-held 14 in step 1322, the hand-held application begins to capture GPS information in step 1324. This GPS information is wirelessly transferred from time to time or continuously to the technology system in step 1326. By turning off the mobile resource management software, the technician can stop the GPS data from being sent to the technology system. After logging into the hand-held device 14, in the illustrated embodiment, the technician is offered the opportunity to agree to a usage policy in step 1328.

If the technician elects to not agree to the usage policy, the hand-held device logs the technician out of the mobile resource management application in step 1327. Among things that may be included in the usage policy are an agreement whereby the technician states that the hand-held device and any cellular telephone provided to the technician will not be used while driving. This may be particularly valuable when the device 10 is utilized in states in which it is illegal to operate a motor vehicle while utilizing a cellular telephone.

If the technician agrees to the usage policy then the technician may view items on the hand-held screen 14 that are in the To Do list representing the manifest generated during the routing step in step 330. The To Do list will typically include, in the illustrated embodiment, a list of work orders to be performed in a prioritized order. With regard to each work order to be performed the technician may then utilize the menu screen on the hand-held device to obtain additional information regarding the work order including customer name, customer telephone number, the location of the vehicle and may access turn-by-turn directions to the location of the vehicle based on the current location indicated by the GPS signal sent to the technology system. After logging in the technician then arrives at the next location, which, if he has the appropriate parts on the truck, may be the location of the first installation or may be the warehouse or other drop box in step 1332.

Upon arriving at the first location for performing work during the day the technician goes through the clock-in process. In one specific embodiment of performing the log-in step 1310, the technician turns on the hand-held device 14 and enters a password using an alphanumeric keyboard on the hand-held device 14. The technician clicks the mobile resource management application icon to initiate the mobile resource management software running on memory on the hand-held device 14. When a usage agreement appears the technician clicks an "OK" icon and then is able to view their To Do list representing the work orders in the manifest assigned to them. After arriving at the first location necessary for carrying out the technician's To Do list, the clock-in step 1410 is performed. As shown, for example, in FIG. 14, the clock-in step 1410 is performed at the beginning of the day start time in step 1420. In one specific embodiment, the step 1420 is performed by clicking on an item in the menu displayed on the screen of the hand-held device 14 which includes an icon stating "clock-in" when the technician is currently clocked-out and includes an icon "clock-out" after the technician has clocked-in. Upon clicking the clock-in icon, the hand-held device 14 captures data regarding the time and GPS location when the clock-in icon was clicked in step 1430. This time and GPS data is then transferred wirelessly to the technology system in step 1440. The technology system stores this time and GPS data and utilizes it to track the technician's clock-in and clock-out times each day. In one specific embodiment, upon the technician clicking on the clock-in and/or the clock-out option, a dialogue box appears on the hand-held device 14 that asks the technician to confirm the action prior to the clock-in or clock-out event actually occurring.

Figure 15:
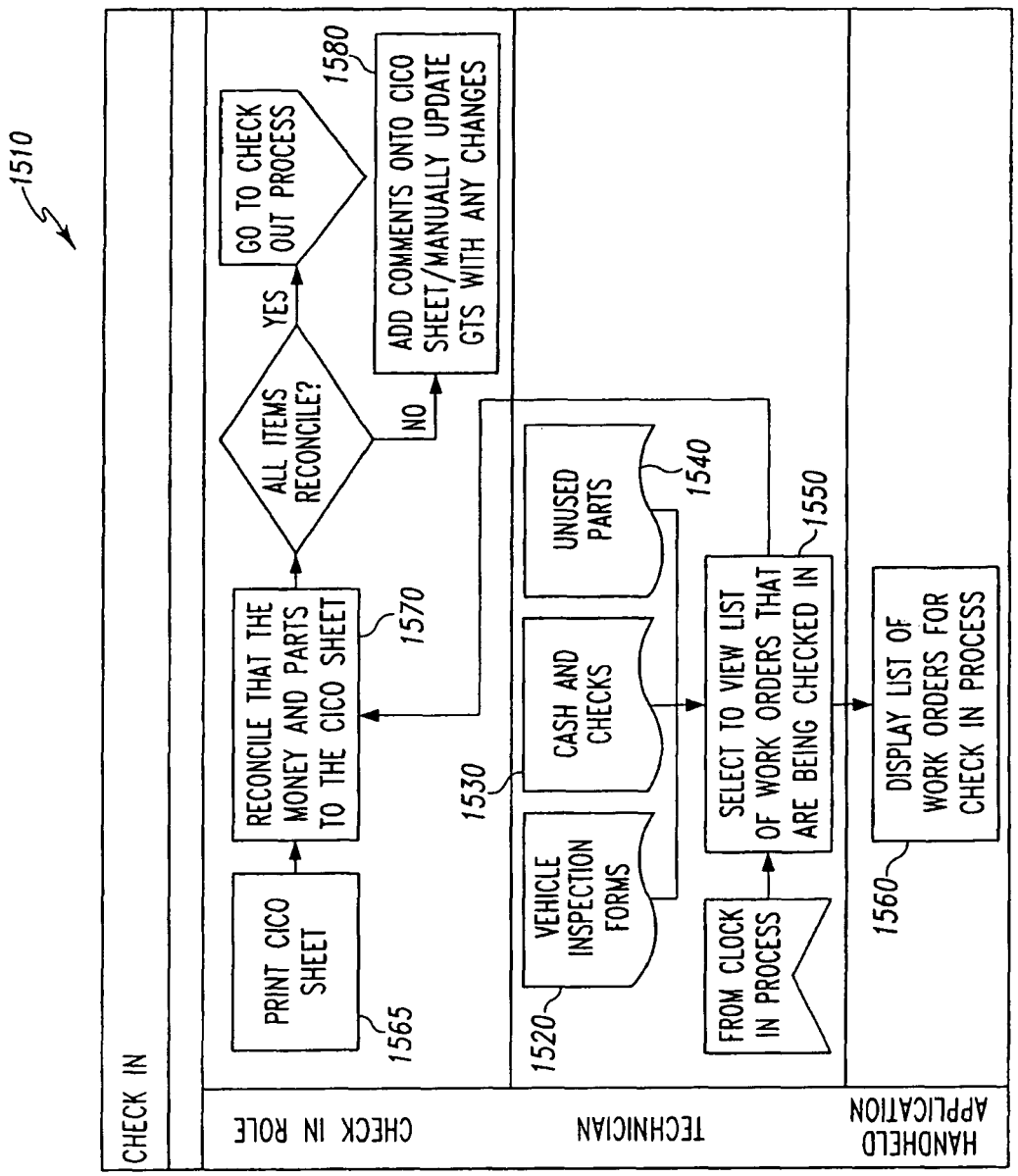
FIG. 15 is a flow diagram of a check-in step of the method for providing location based content delivery services of FIG. 11.

Following, although typically not immediately after, the clock-in step 1410, the check-out step 1500 is performed as shown, for example, in FIG. 15. If the technician still has vehicle inspection forms 1520, cash and checks 1530 or unused parts 1540 from a previous day, then they select to view the list of work orders that are being checked in step 1550. In step 1560, the hand-held device 14 displays a list of work orders for check-in process. As part of the check-in role in step 1570, the money and parts are reconciled against a check-in/check-out sheet that is printed in step 1565. If all of the items reconcile then the check-out process 1610 is performed. If the items do not reconcile then comments are added to the check-in/check-out sheet and the technology system is updated with any changes in step 1580. While shown in FIG. 11 as occurring as a portion of the check-out process 1500, the check-in step 1510 can be performed at different times of the day. Some technicians can complete check-in step 1510 at the end of the day before clocking out and sometimes the technician will complete check-in step 1510 the next morning after clocking in. Some technicians will also complete the check-in step 1510 remotely at drop boxes or other locations with no check-in associate present.

Check-out step 1610 occurs before the technician leaves the location to begin their work day. Parts of the check-out process 1610 can also occur during the day if the technician needs to return to pick up additional parts. Since the hand-held device 14 has downloaded the work order information in electronic form in the order in which they are supposed to be completed, the hand-held device 14 will be able to display an assumed list of parts based on the existing work orders stored on the hand-held device 14. If a work order is removed from the hand-held device 14, the parts associated with the removed work order are removed from the list of parts stored on the hand-held device 14. Among the information included in the work order information, in one specific example, is the customer name, the job name, the customer phone number, the vehicle identification information, the parts required for completion of the job, and any other information required to create an invoice.

Figure 16:
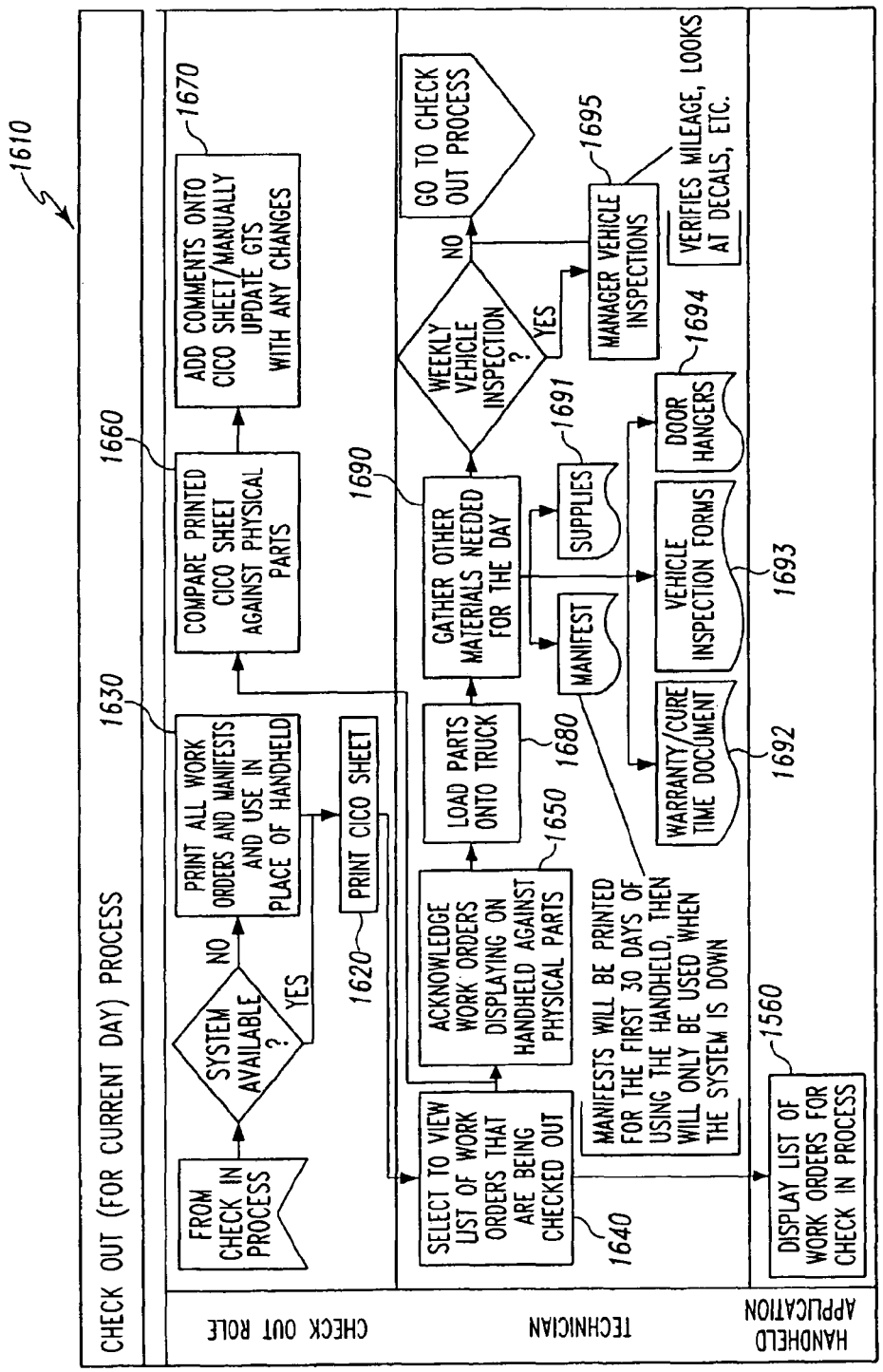
FIG. 16 is a flow diagram of a check-out step of the method for providing location based content delivery services of FIG. 11.

During the check-out process 1610 if the system is available then a check-in/check-out sheet is printed in step 1620 as shown, for example, in FIG. 16. In addition to printing the check-in and check-out sheet, if the system is then available a copy of all work orders and manifests are printed out in step 1630 in place of using the information available from the hand-held device 14. The technician then selects a view of the list the work orders that are being checked-out in step 1640. The hand-held device 14 displays this list of work orders during the check-out process in step 1650. The technician acknowledges the work orders displayed on the hand-held device 14 against physical parts in step 1650. The physical parts are compared to the printed check-in/check-out sheet in step 1660. Comments are added to the check-in/check-out sheet and the technology system is updated with changes in step 1670. The parts that were removed from inventory and set aside as part of the pre-dispatch process 1112 are loaded onto the truck in step 1680. Other materials that are needed for the day are gathered in step 1690. These may include additional supplies 1691, warranty/cure time documents 1692, vehicle inspection forms 1693, and door hangers 1694 in a glass installation embodiment. Those skilled in the art will recognize that when the method 1100 is utilized to supply other outside services, the list of materials required will be different. If it is time for a weekly inspection then a manager may inspect the vehicle to verify mileage, decals and other information in step 1695. After completion of the vehicle inspection, or if it is not time for the vehicle inspection the technician then goes to the complete service step 1700.

Figure 17:
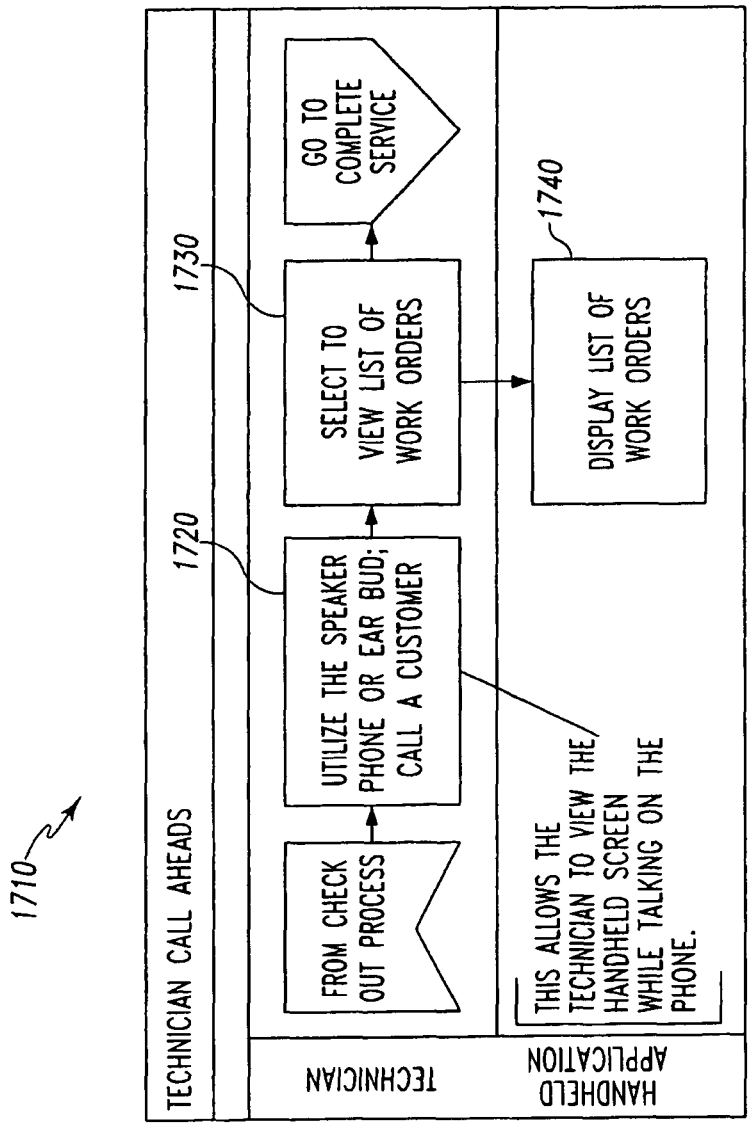
FIG. 17 is a flow diagram of a technician call ahead step of the method for providing location based content delivery services of FIG. 11.
Figure 18A:
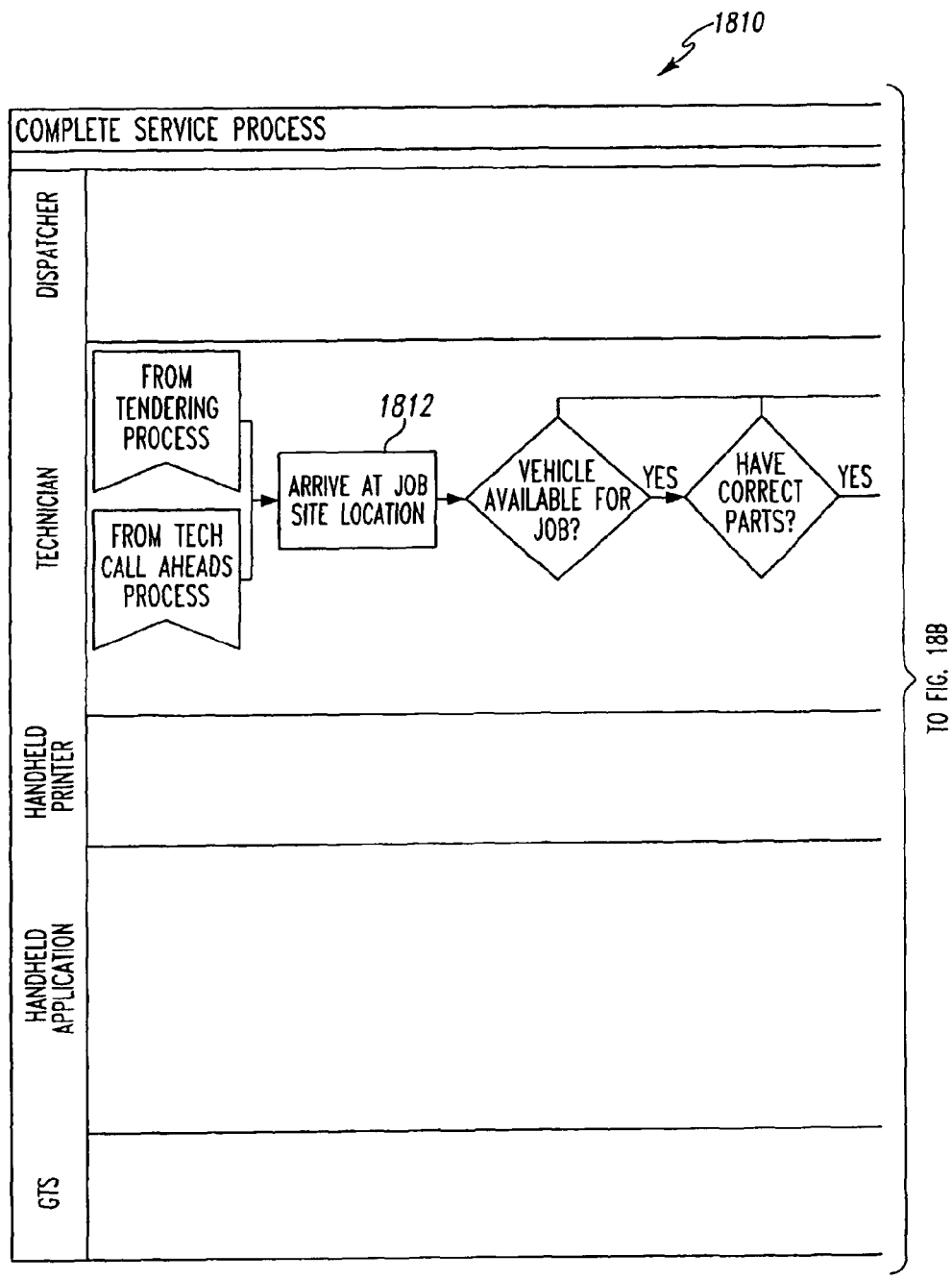
FIG. 18 is a flow diagram of a complete service step of the method for providing location based content delivery services of FIG. 11.
Figure 18B:
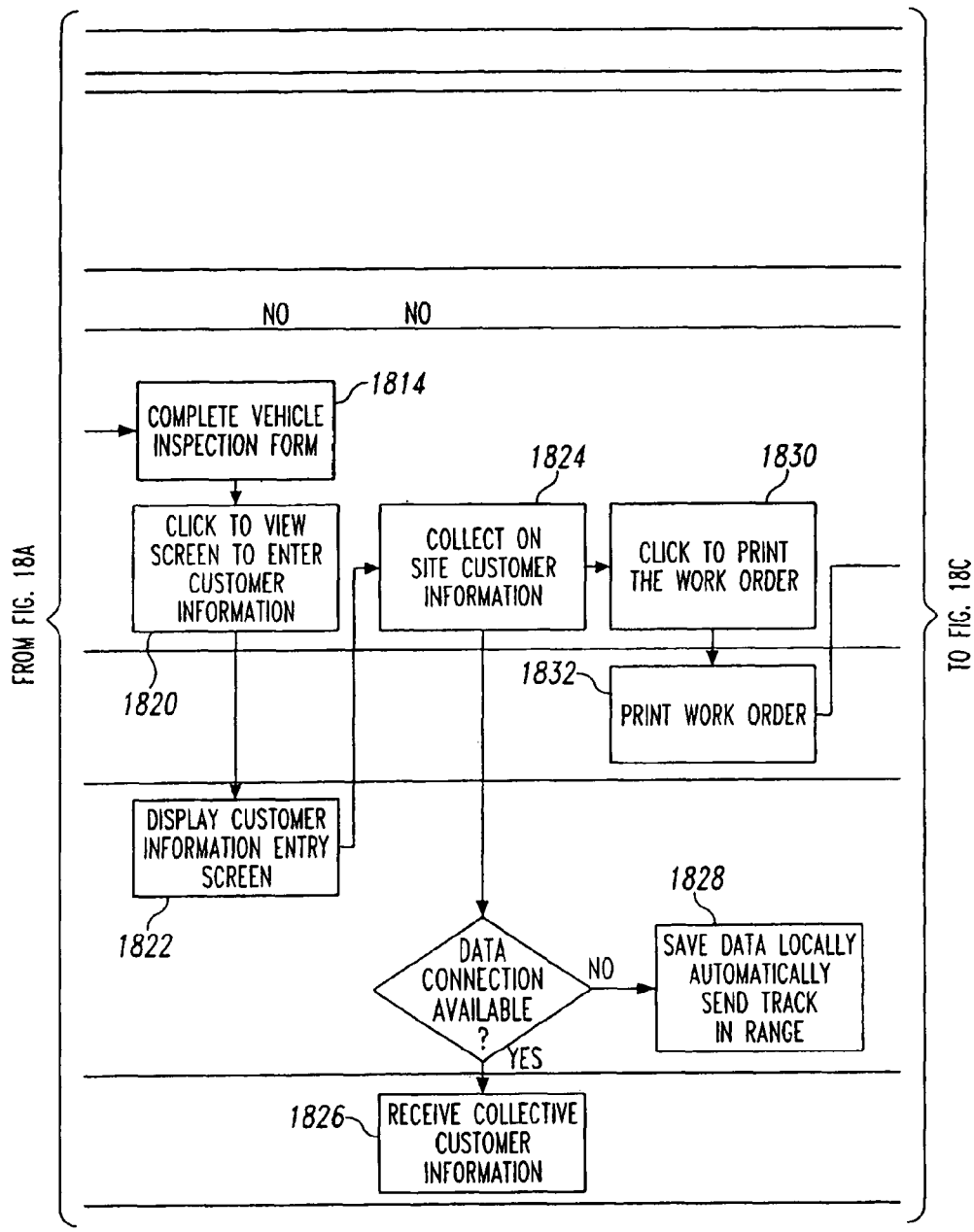
Figure 18C:
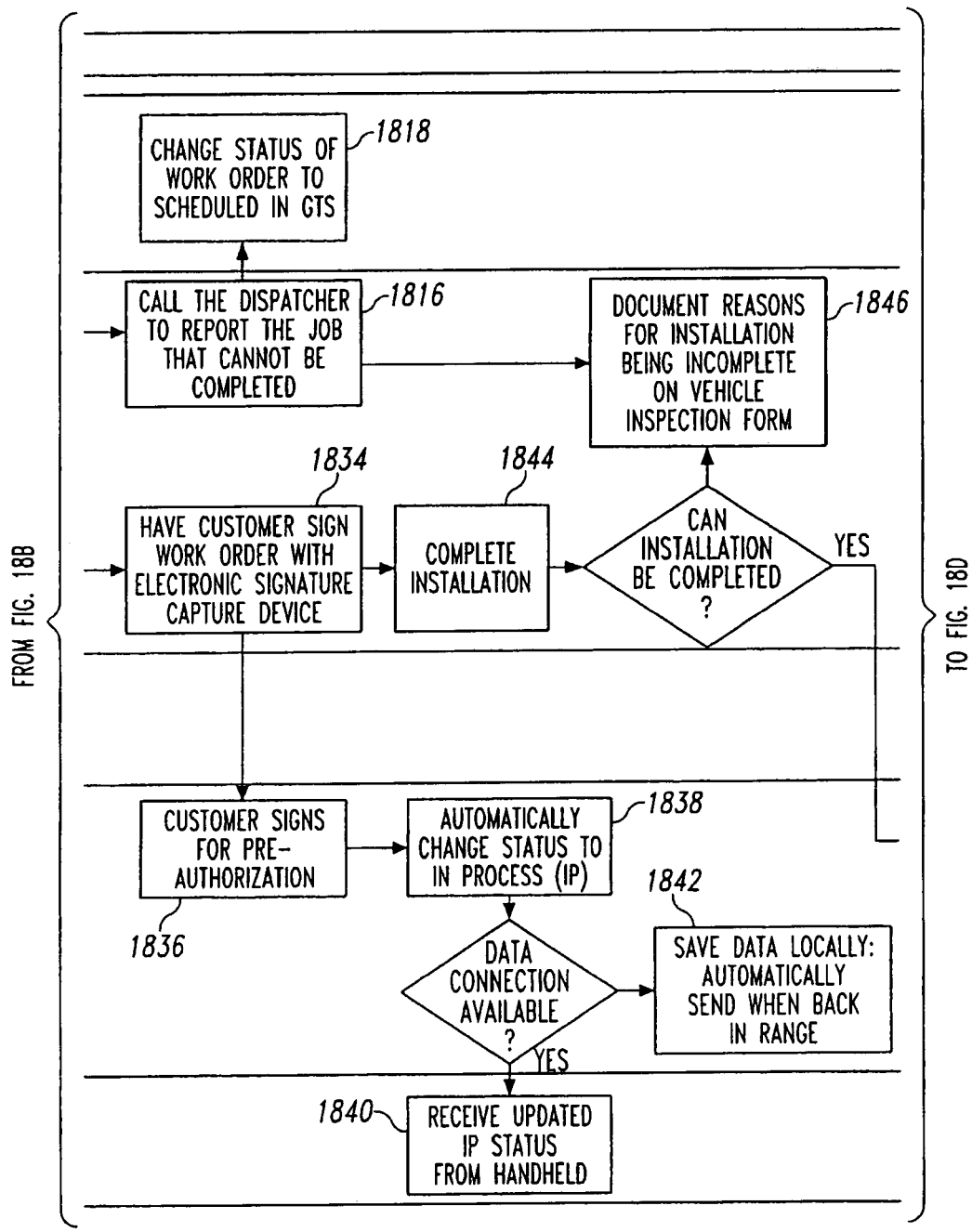
Figure 18D:
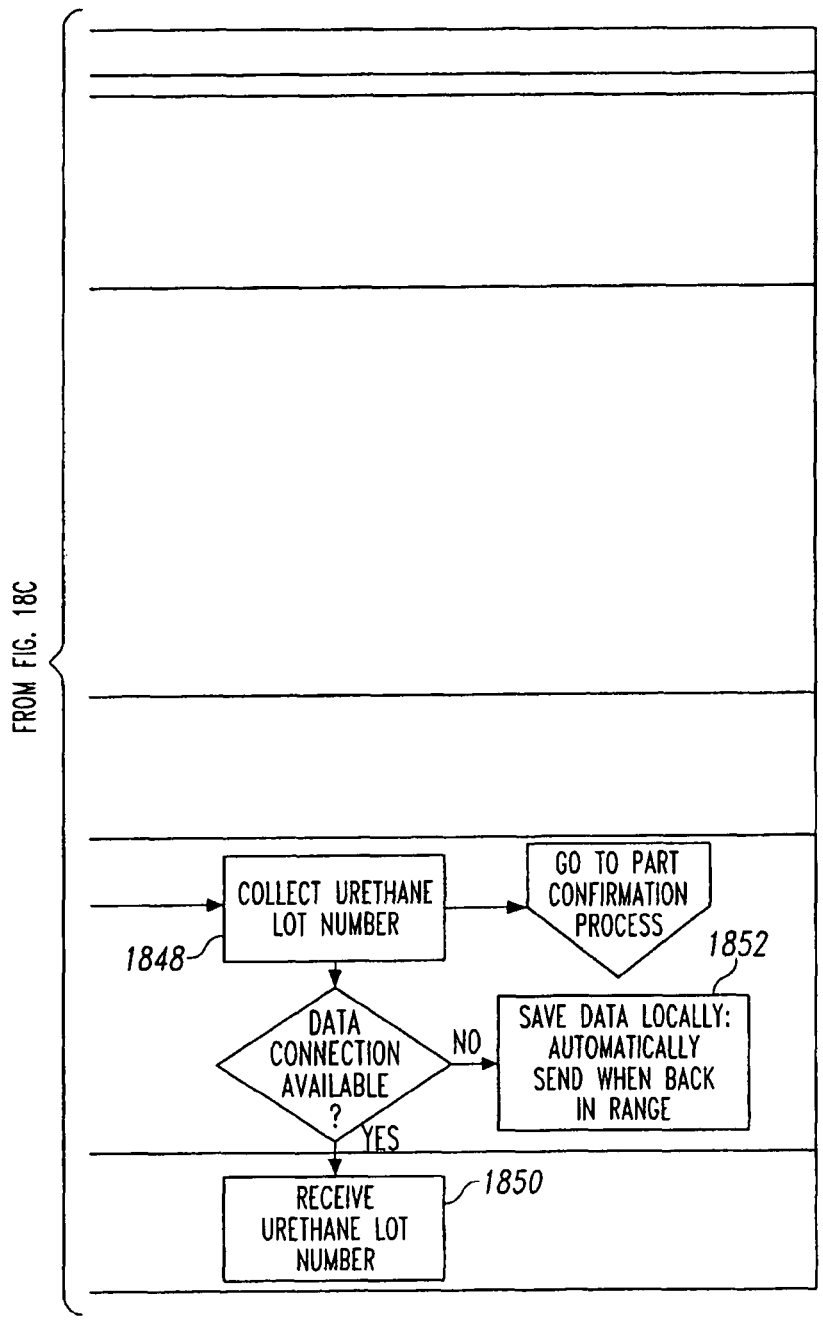

One step included in the complete service step 1700 is the technician call ahead step 1710 as shown, for example, in FIG. 17. Technicians can perform the technician call ahead step 1710 to cause a customer to confirm the appointment and the work that is to be completed. Depending on the technician's day, the technician call ahead step 1710 may be done at different times. Since it may be preferable to perform the technician call ahead step 1710 in the morning before leaving for the first work order, the technician call ahead step 1710 is described herein as a first step towards completed service step 1700.

The prior descriptions have referred to and the following descriptions will refer to certain items that are displayed on the display screen of the hand-held device 14. The display on the display screen of the hand-held device 14 is generated by the mobile resource management software running on the hand-held device 14. A portion of the mobile resource management software running on the hand-held device 14 will cause a mobile resource management icon to be displayed upon the display screen of the hand-held device 14 in additional to other icons that are normally displayed upon the initial screen of the hand-held device 14. Upon activating the MRM icon, the display screen of the hand-held device 14 prompts the technician to log-in. Upon logging-in, the MRM causes the hand-held device 14 to display a screen including a To Do list and the current clock-in/clock-out status of the technician. The clock-in/clock-out status of the technician can be changed by clicking on the icon indicating their current status. Upon clicking upon the icon, a confirmation dialogue box is displayed requesting confirmation that the technician desires to change their clock-in/clock-out status. The To Do list includes a list of all jobs presented in a prioritized manner indicating a job number, the date on which the job is to be performed, the address at which the job is to be performed and the current status of the job.

By clicking on a specific job in the To Do list, a job detail screen is generated that includes a job detail tab and a parts tab. The job detail tab causes the screen to be displayed with information regarding the job to be performed. In the glass repair embodiment, the information included on the job detail screen may include the name of the customer, the job type, the address, the time and place where the vehicle will be available, the model, color and year of the car, instructions on how access to the vehicle is to be obtained, a contact phone number, a home phone number and a work phone number for the customer, the amount to be collected, the labor costs and material costs, and/or a deductible amount and a menu. The menu includes a start job icon which changes the status of the job from routed out ("RO") to in progress ("IP"), an end job icon which changes the status of the job from IP to job complete ("JC"). A directions icon which activates the turn-by-turn directions functionality of the system and generates a job directions screen, a job detail parts tab which switches to the parts tab screen, a hide menu option, a select option, and a close option. The job detail parts tab screen displays a list of part numbers, price and description for each of the parts to be utilized in completion of the job. The start job screen also allows an authorization copy to be printed out for customer signature prior to beginning the job. The end job icon also activates the processing device 18 to permit printing of receipts and processing of credit card information.

Upon logging into the MRM process the To Do list is displayed on the hand-held device 14. The To Do list displays a high level overview of the jobs that are expected to be completed by the technician for the day. Pop up messaging will alert the technician that a new work order has been added or modified on their To Do list. When the status of the technician indicates that they are clocked-in, clicking on the To Do list allows work order details to be displayed on the hand-held device 14.

When the technician performs the technician call ahead step 1710, the technician utilizes a speaker phone or an ear bud connected to the hand-held device 14 to call the customer 1720. The customer call information is available on the hand-held device 14 through the job detail screen. Thus, the utilization of the speaker phone or the ear bud allows the technician to view the hand-held screen while talking on the phone. The technician selects to view the list of work orders in step 1730 and displays the list of work orders in step 1740. After completing one or more call aheads, the technician begins the complete services process 1810 as shown, for example, in FIG. 18.

The technician arrives at the job in step 1812. Prior to arriving at the job, the technician may access turn-by-turn directions utilizing the directions menu button displayed on the screen of the hand-held device 14 with regard to the work order they are performing. If the vehicle is available for the job and the correct parts are available then the technician completes the inspection form in step 1814. If the vehicle or the parts are not available then the technician calls the dispatcher to report the job cannot be completed in step 1816 and the status of the job is changed to schedule in the technology system in step 1818. When the vehicle is available and correct parts are available and the vehicle inspection form has been completed in step 11814, the technician then clicks to view the screen to enter customer information in step 1820. This causes the hand-held application to display a customer information entry screen in step 1822. The technician then collects onsite customer information in step 1824.

The onsite customer information collected 1824 may include viewing the vehicle identification number of the vehicle to be serviced and entering that information into the hand-held device 14. If there is a data connection, then the customer information entered into the hand-held device 14 is sent to the technology system of server 12 in step 1826. Otherwise, the data is saved locally on the hand-held device 14 and automatically sent back to the technology system of server 12 when the hand-held device 14 comes into range for transmission in step 1828. After collecting the onsite customer information the technician clicks to print a work order in step 1830. The hand-held printer 28 of the processing device 18 then prints a work order in step 1832. This work order is given to the customer for signature with electronic signature capture device 16 in step 1834. If the hand-held device 14 detects that the signature capture device 16 has captured a customer's signature indicating pre-authorization in step 1836, the hand-held device automatically changes the status of the work order to in process (IP) in step 1838. If a data connection is available then the status of the work order is updated in the technology system in step 1840. If a data connection is not available the data is saved locally and automatically sent back when the hand-held device 14 is in range in step 1842.

After receiving the customer's signature on the work order, the technician completes the installation and other work indicated on the work order in step 1844. This of course assumes that the installation can be completed. If the installation cannot be completed then the technician documents reasons for being unable to complete the work order on a vehicle inspection form in step 1846. This information is then transmitted to the dispatcher to report that the job cannot be completed in step 1816 and the status of the work order is changed to scheduled in step 1818. If the work order can be completed, in the glass installation embodiment, the technician utilizes the hand-held application 14 to collect the urethane lot number in step 1848. If there is a data connection available, the urethane lot number is transmitted by the hand-held device 14 to the technology system of the server 12 in step 1850. Otherwise, the urethane lot number information data is stored locally on the hand-held device 14 and automatically sent back to the technology system of the server 12 when a data connection becomes available in step 1852.

In one specific embodiment, the MRM program running on the hand-held device 14 will require the technician to input the vehicle identification number at the job site on all accounts. Or otherwise validate the VIN if that information has already been completed on the work order. Such entry or validation may also be required for license plate numbers and state of license and mileage.

Figure 19A:
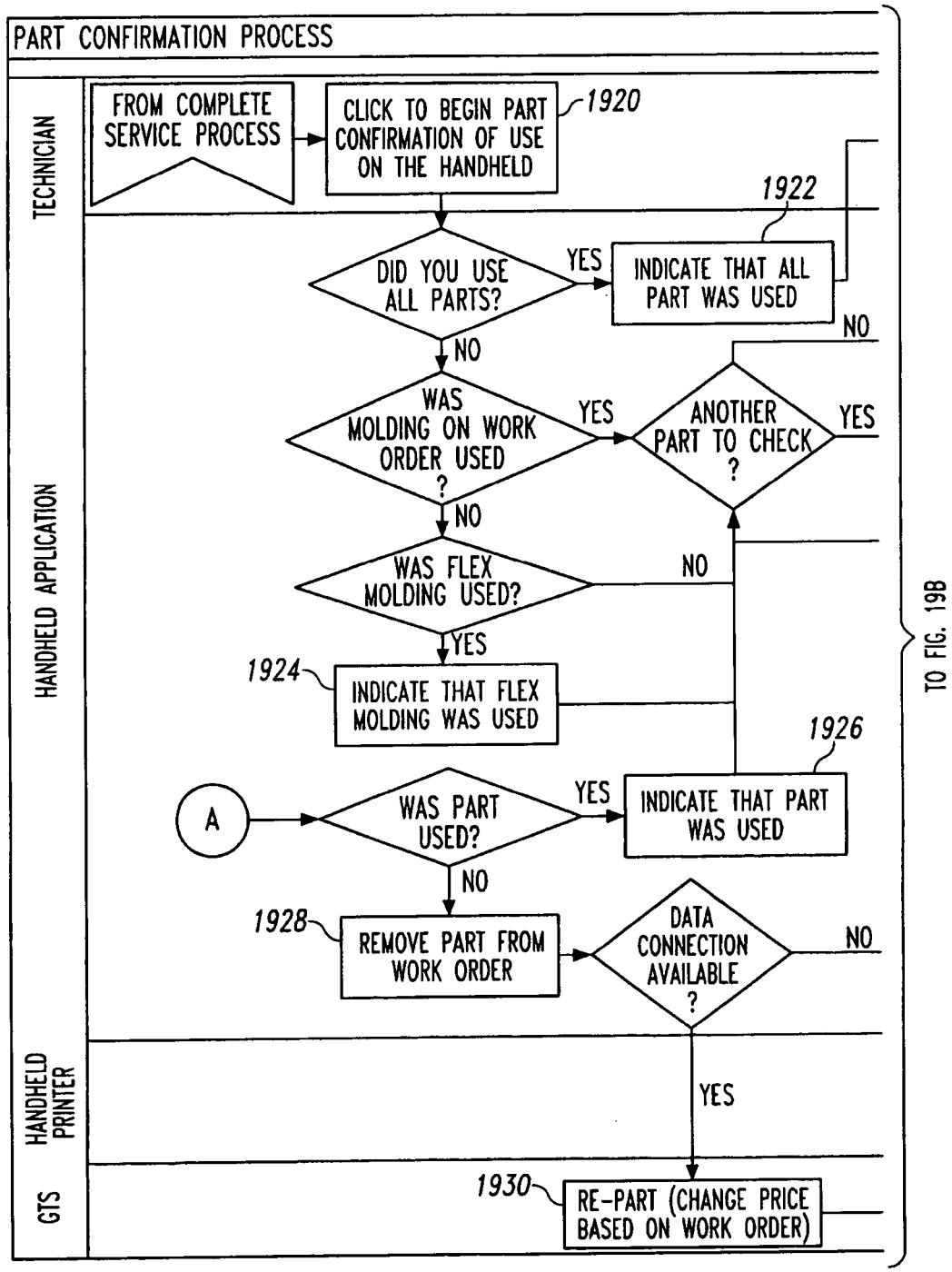
FIG. 19 is a flow diagram of a part confirmation step of the method for providing location based content delivery services of FIG. 11.
Figure 19B:
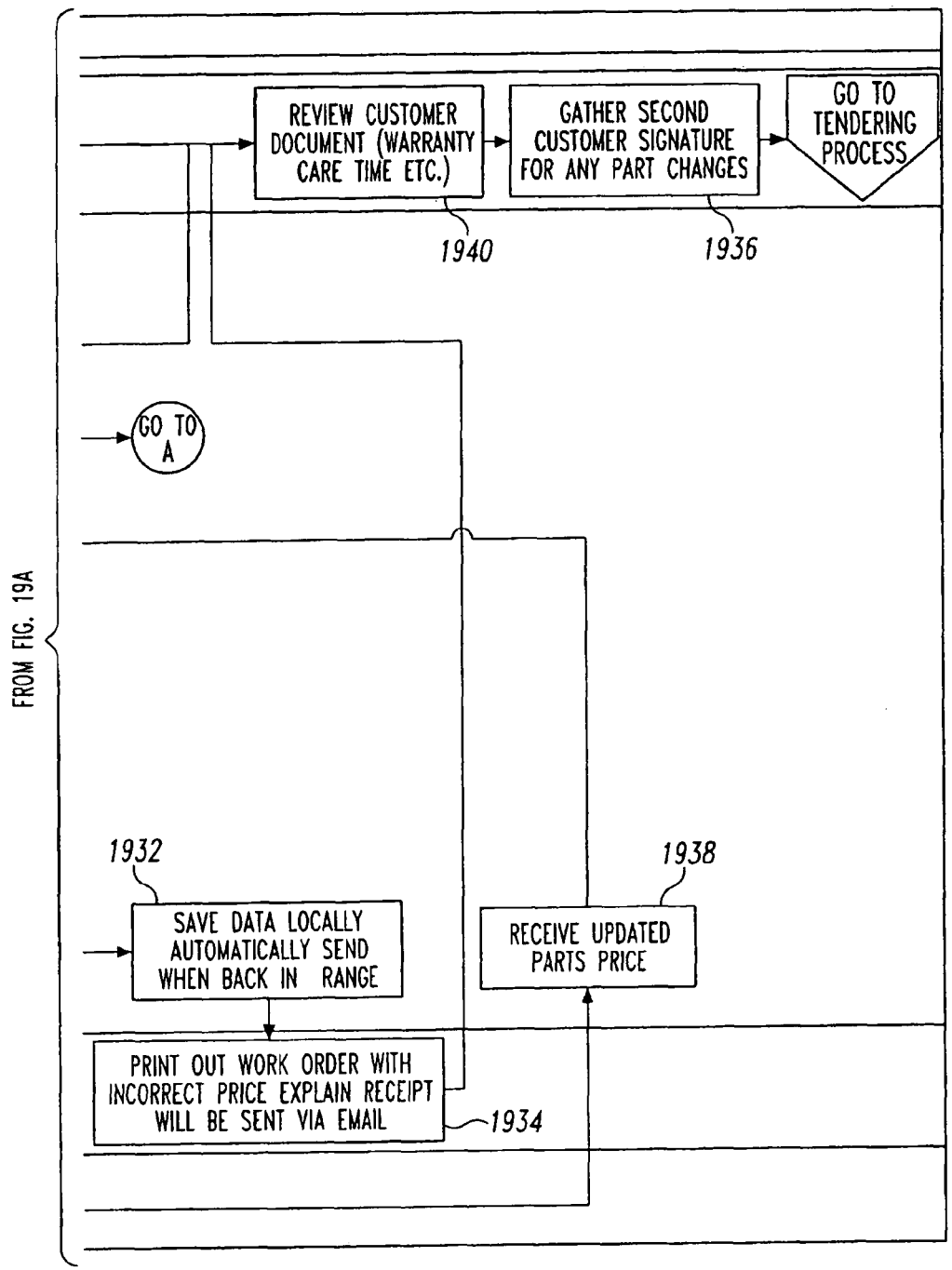

After completing the installation and collecting the information from the customer, the technician performs the part confirmation process step 1910, as shown, for example, in FIG. 19, to determine that the parts were used during the installation process. The part confirmation process 1910 is initiated by the technician clicking begin part confirmation of use on the hand-held device 14 in step 1920. If the technician used all the parts on the work order in completing the job then they indicate that all the parts were used in step 1922. If some parts, such as molding in a glass installation situation, were not used, then it is determined whether a flexible form of molding was used and if so, in step 1924, the hand-held application indicates that flex molding was used. If molding was not on the work order and there is another part to check then if that part was used the hand-held application indicates that the part was used in step 1926. If a part was not used, the part is removed from the work order in step 1928. Anytime a part was not used if there is a data connection available, then the hand-held device 14 sends that information to the technology system of server 12 to re-part the work order based on a change in price in step 1930. If a data connection is not available, then that data is saved locally until back in range in step 1932. When the data connection is not available, a work order must be printed out and an explanation indicated thereon that the price is incorrect and that an updated work order will be provided to the customer in step 1934. If a connection is available, then the technology system of server 12 wirelessly transfers an updated parts and price list for the work order to the hand-held device 14 in step 1938.

Once all the parts are confirmed the technician reviews customer documents including such things as warranty and cure times in step 1940. If there was a parts change, then in step 1936 the technician obtains another customer signature for the parts change. Like the first signature obtained, the signature is obtained on the signature capture device 16 and an image is sent to the hand-held device 14. The technician then seeks to obtain payment for the services rendered.

Figure 20A:
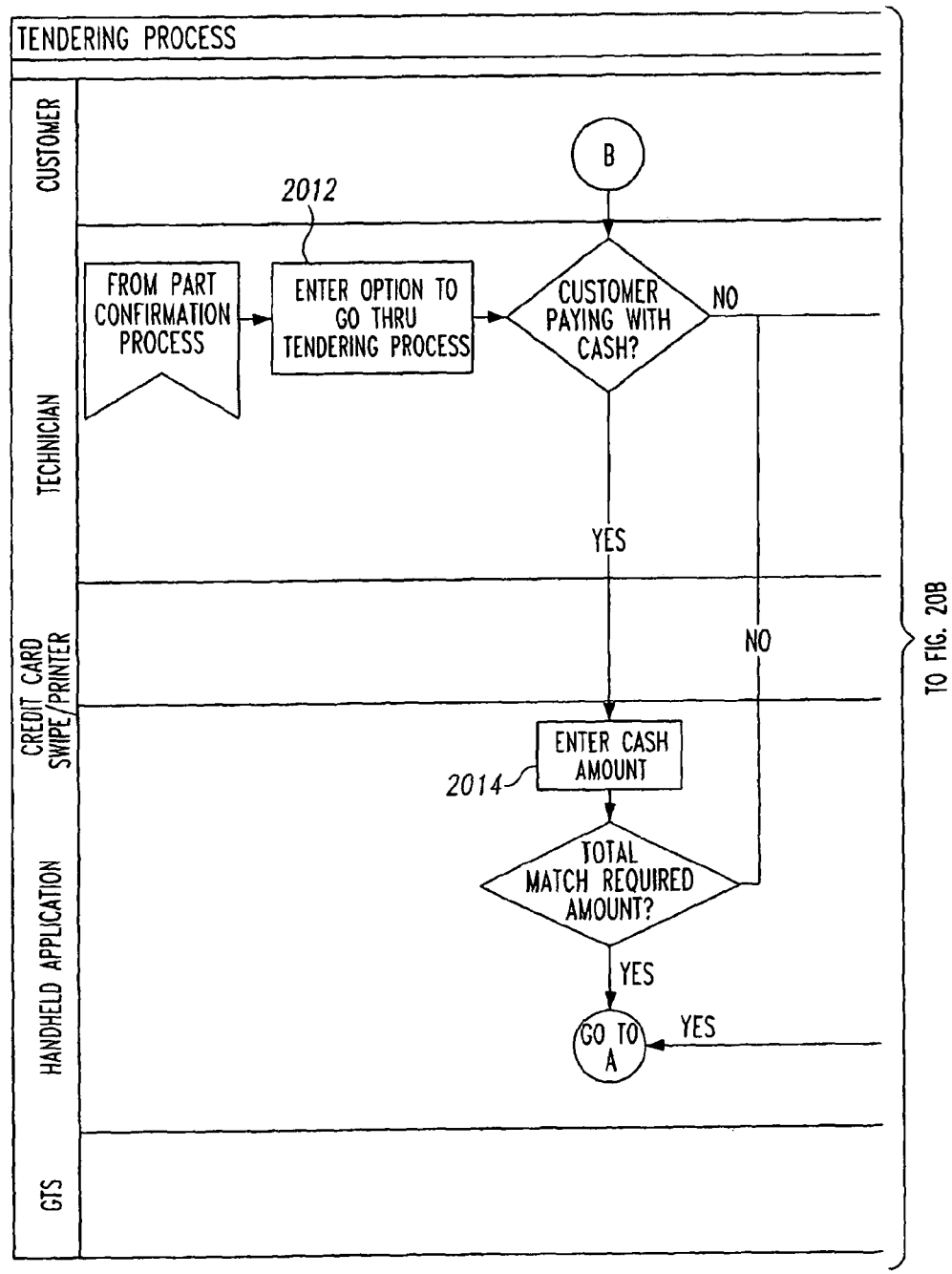
FIG. 20 is a flow diagram of a tendering process step of the method for providing location based content delivery services of FIG. 11.
Figure 20B:
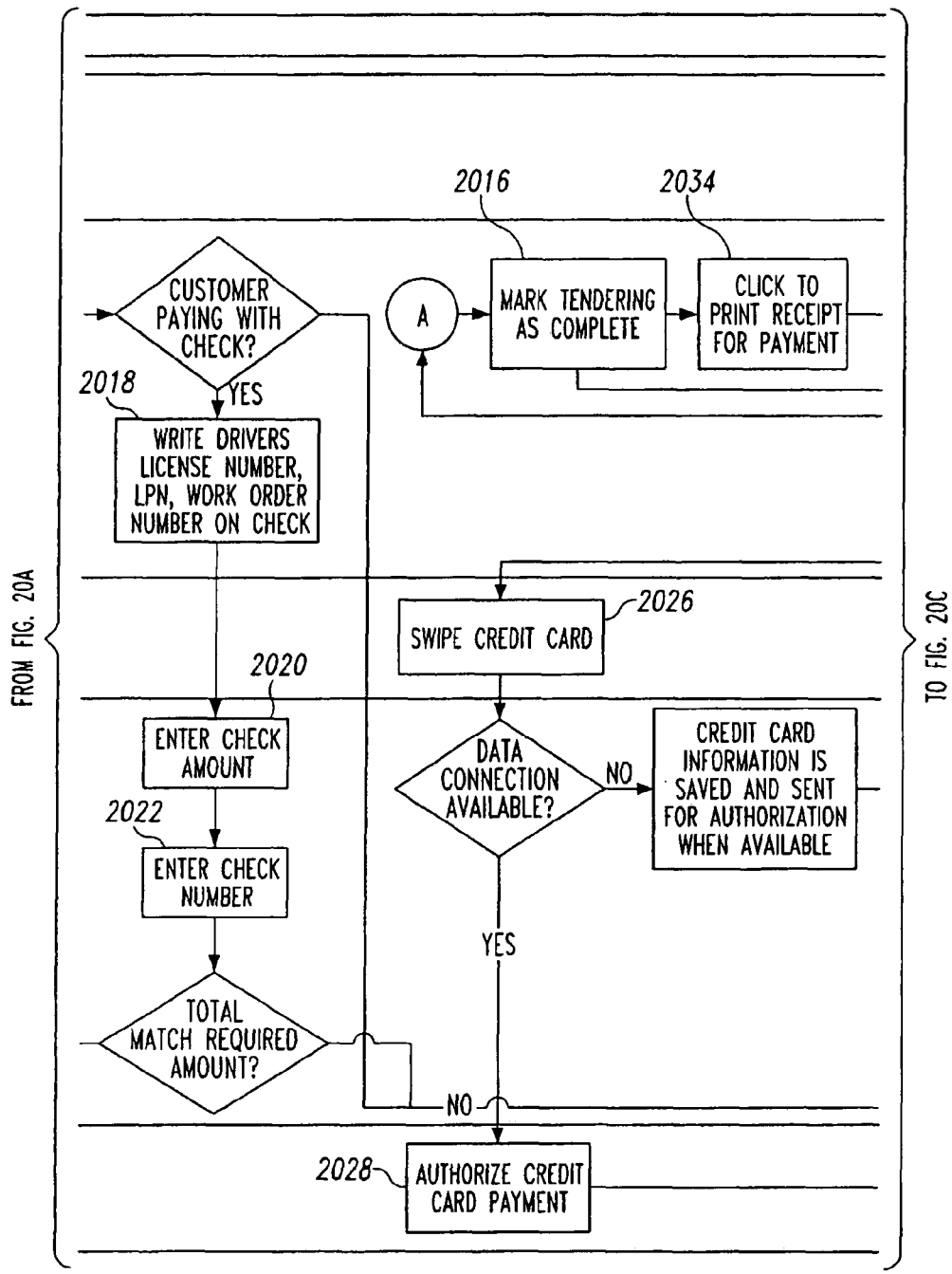
Figure 20C:
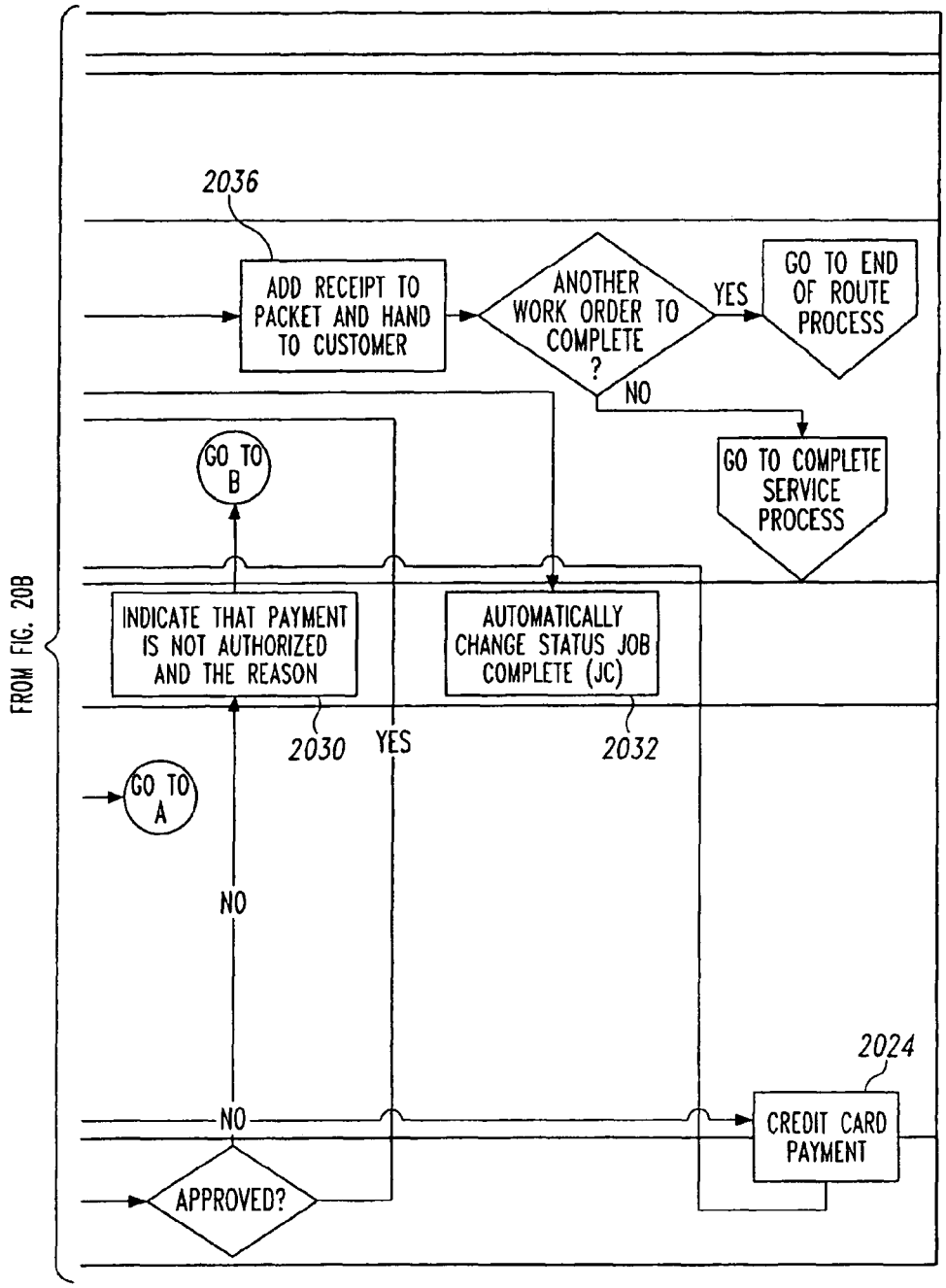

After the part confirmation process 1910 has been performed, the technician performs the tendering process 2010, as shown, for example, in FIG. 20, in an attempt to obtain payment from the customer. The technician enters the option to go through the tendering process in step 2012. It is then determined whether the customer is paying with cash. If the customer is paying with cash, then the cash amount is entered into the hand-held device 14 in step 2014. If the cash amount matches the total amount required then the technician marks the tendering as complete in step 2016. If the total amount of cash does not match the amount required then it is determined whether the customer will be paying by check. If so, the technician writes the driver's license number, LPN and work order number on the check in step 2018. The technician then enters the check amount into the hand-held device 14 in step 2020 and also enters the check number into the hand-held device 14 in step 2022. If the total amount of the check either alone and/or in combination with any cash tendered, is equal to the total amount required, then the technician marks tendering as complete in step 2016. If the total amount of the check alone or the check in combination with any cash submitted does not match the total, then it is determined whether the customer would like to make a credit card payment in step 2024.

If the customer selects to make a credit card payment, the processing device 18 is utilized to swipe the credit card through the credit card slot 24 in step 2026. If there is a data connection available, the information captured by the processing device 18 and transferred to the hand-held device 14 is then wirelessly sent for authorization of the credit card payment in step 2028. If authorization is approved then the technician marks tendering as complete in step 2016. If no data connection is available, the credit card information is saved and sent for authorization when a connection becomes available. If authorization is not received, then in step 2030, the processing device 18 indicates that payment is not authorized. If credit card is not authorized then the technician again asks the customer whether they wish to pay with cash and if not, whether they wish to pay with check. Upon marking the tendering process as complete 2016 the hand-held application automatically changes status of the work order to complete in step 2032.

The technician then clicks an icon on the hand-held device 14 to print a receipt for payment in step 2034. The receipt is then added to a packet of printed documents and handed to the customer in step 2036. That packet of printed documents may contain additional information such as warranty information, cure time information and other details required by law. If after giving the receipt to the customer there is another work order to be completed the complete service step 1810 is then performed with regard to the next work order on the To Do list. If there is not another work order to be completed then the end of the route process 2110 is begun.

Figure 21:
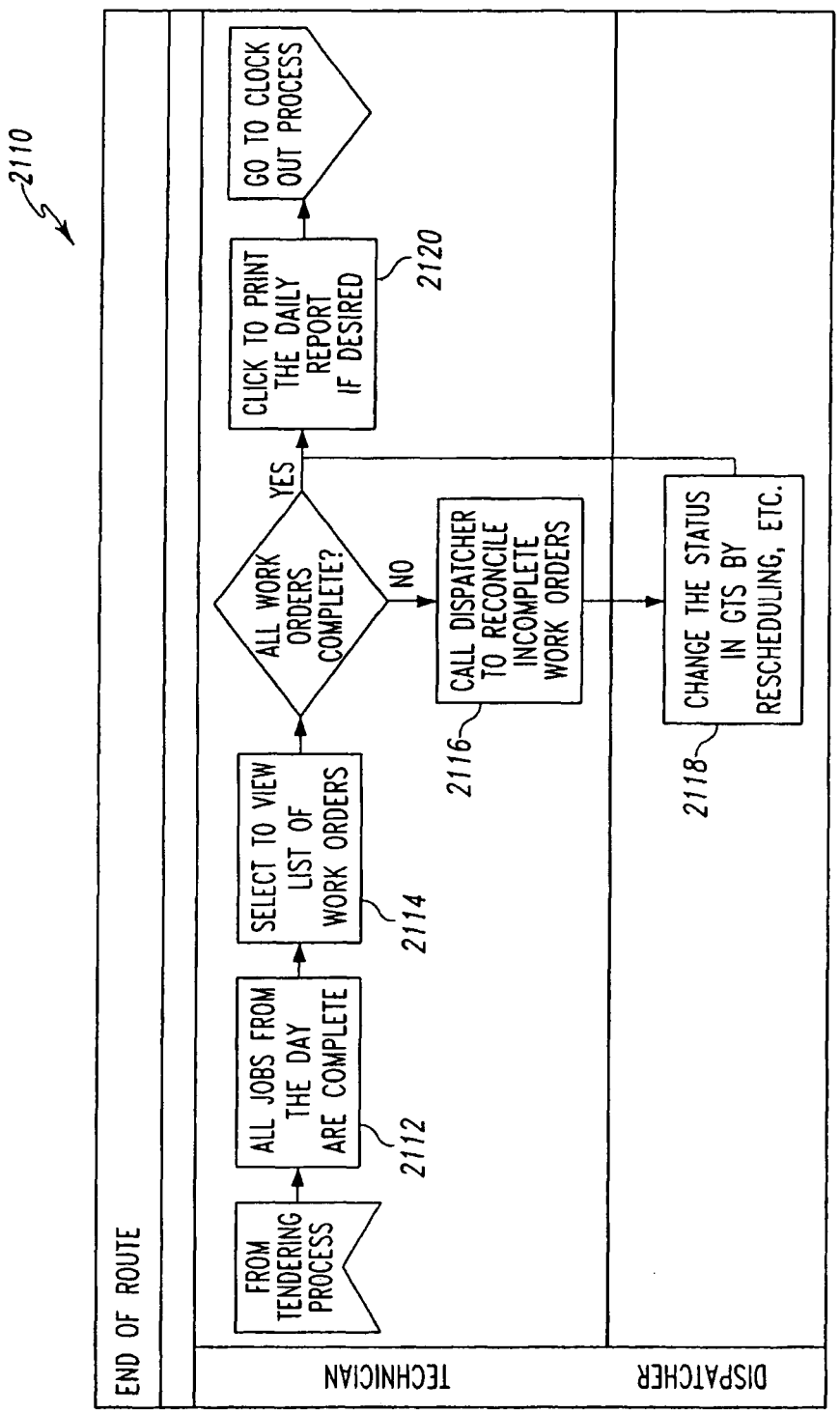
FIG. 21 is a flow diagram of an end of route step of the method for providing location based content delivery services of FIG. 11.

During the end of route step 2110, as shown, for example, in FIG. 21, when the technician has completed all the jobs he will complete for the day in step 2112, the technician then selects to view a list of work orders on the screen of the hand-held device 14 in step 2114. If all the work orders are completed, the technician then clicks the icon to print out a daily work report if desired in step 2120. If the technician had not completed all of the work orders when all the jobs are completed for the day, the technician then calls the dispatcher to reconcile incomplete work orders in step 2116. The dispatcher changes his status in the technology system by rescheduling any incomplete work orders in step 2118.

Figure 22:
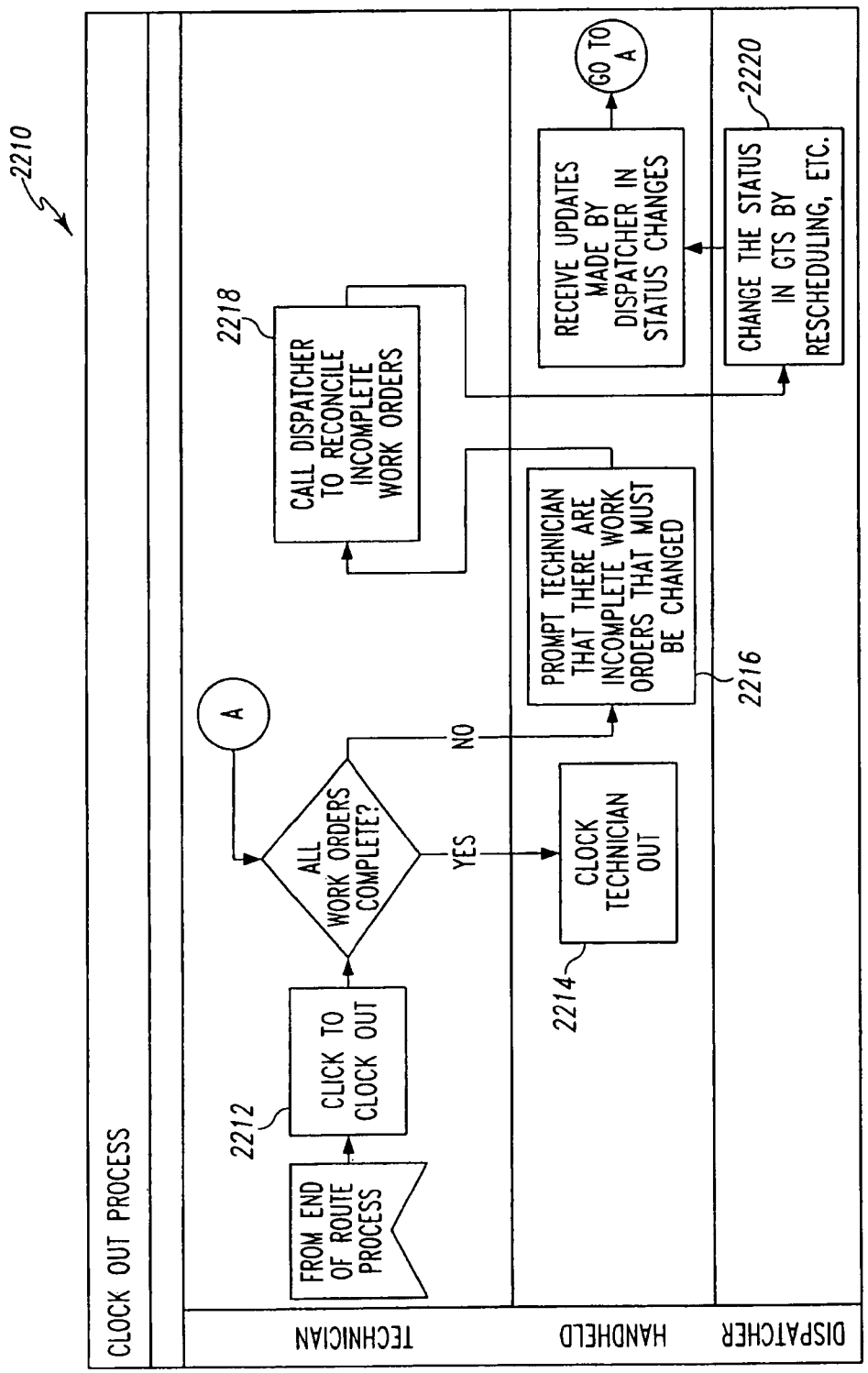
FIG. 22 is a flow diagram of a clock-out step of the method for providing location based content delivery services of FIG. 1.

Once the end of the route step 2110 is completed the clock-out process 2210 is performed, as shown, for example, in FIG. 22. The technician clicks on the current clock-in/clock-out status icon to change the status to clock-out in step 2212. If all the work orders are complete the technician is clocked-out on the hand-held device 14 in step 2214. If all the work orders are not complete the technician is prompted by a message on the screen of the hand-held device 14 indicating that there are incomplete work orders that must be reconciled in step 2216. The technician then calls the dispatcher to reconcile incomplete work orders in step 2218. The dispatcher changes the status in the technology system of the incomplete work orders by rescheduling or canceling the work order in step 2220. As shown, for example, in FIG. 11, prior to performing the clock-out process 2210, the technician may return to the warehouse to complete the check-in process 1510.

At any time during the work day add-on work orders or collateral work orders may be received by the technician, as shown, for example, in FIG. 23. If an add-on work order is scheduled by a dispatcher and a technician has not completed the check-out step 1500, the dispatcher routes the work order to the technology system in step 2310. The dispatcher then sends the work order to the technician's hand-held device 14 in step 2312. The hand-held device 14 receives the work order in step 2314. In step 2316, the dispatcher prints an updated check-in/check-out sheet. The updated check-in/check-out sheet is sent to the person filling the checkout role in step 2318 and to the warehouse associate in step 2320. The warehouse associate then prints a pick ticket and picks the parts necessary for completion of the work order in step 2320. The add-on work order scheduled for a technician that is in the building 2322 who has not completed check-out must be accepted before the technician completes check-out in order for the add-on work order process shown in FIG. 23 to be performed.

Figure 28:
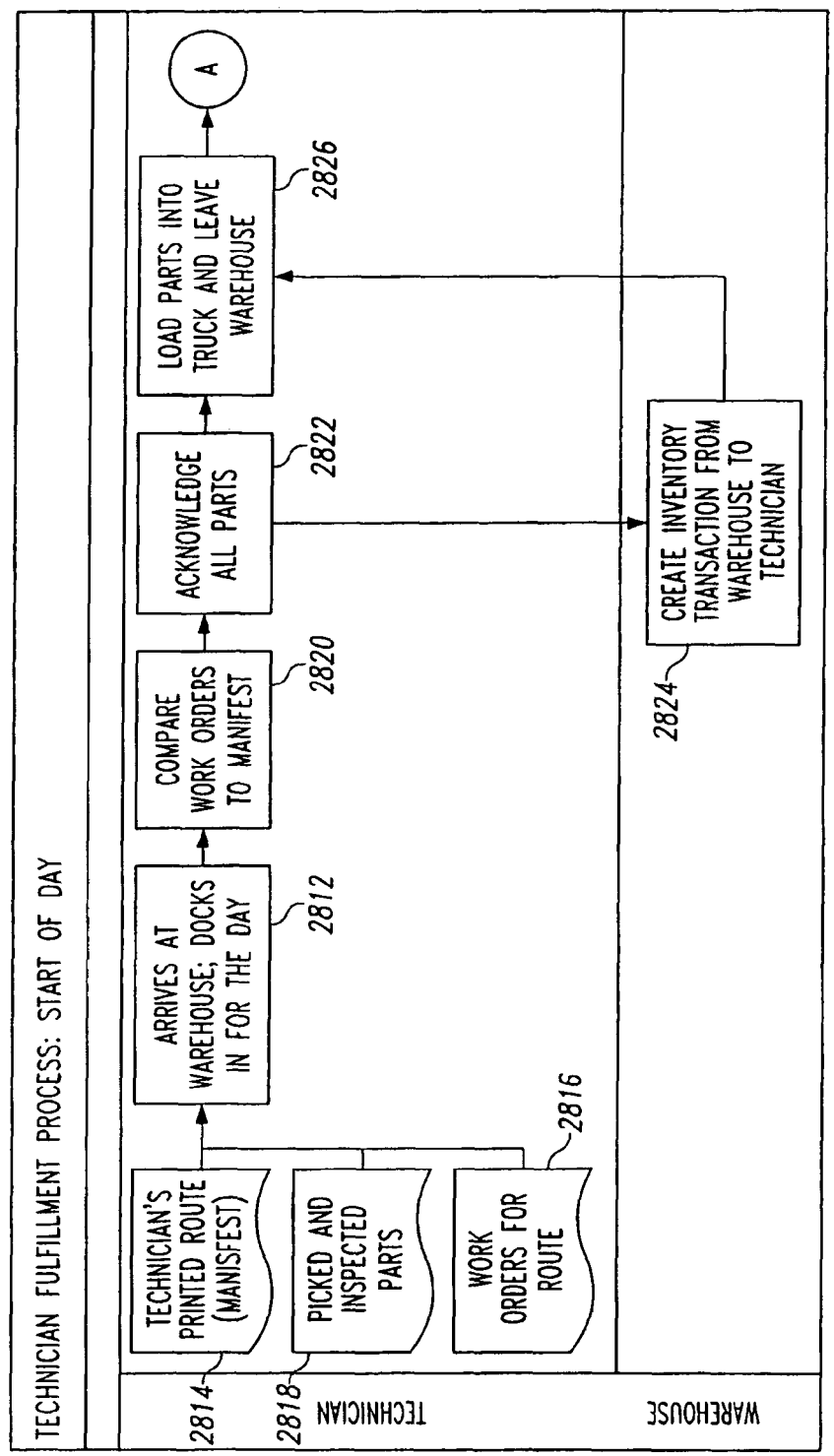
FIG. 28 is a flow diagram of a start of day portion of the technician fulfillment process step of a prior art method for providing location based content delivery services.
Figure 29A:
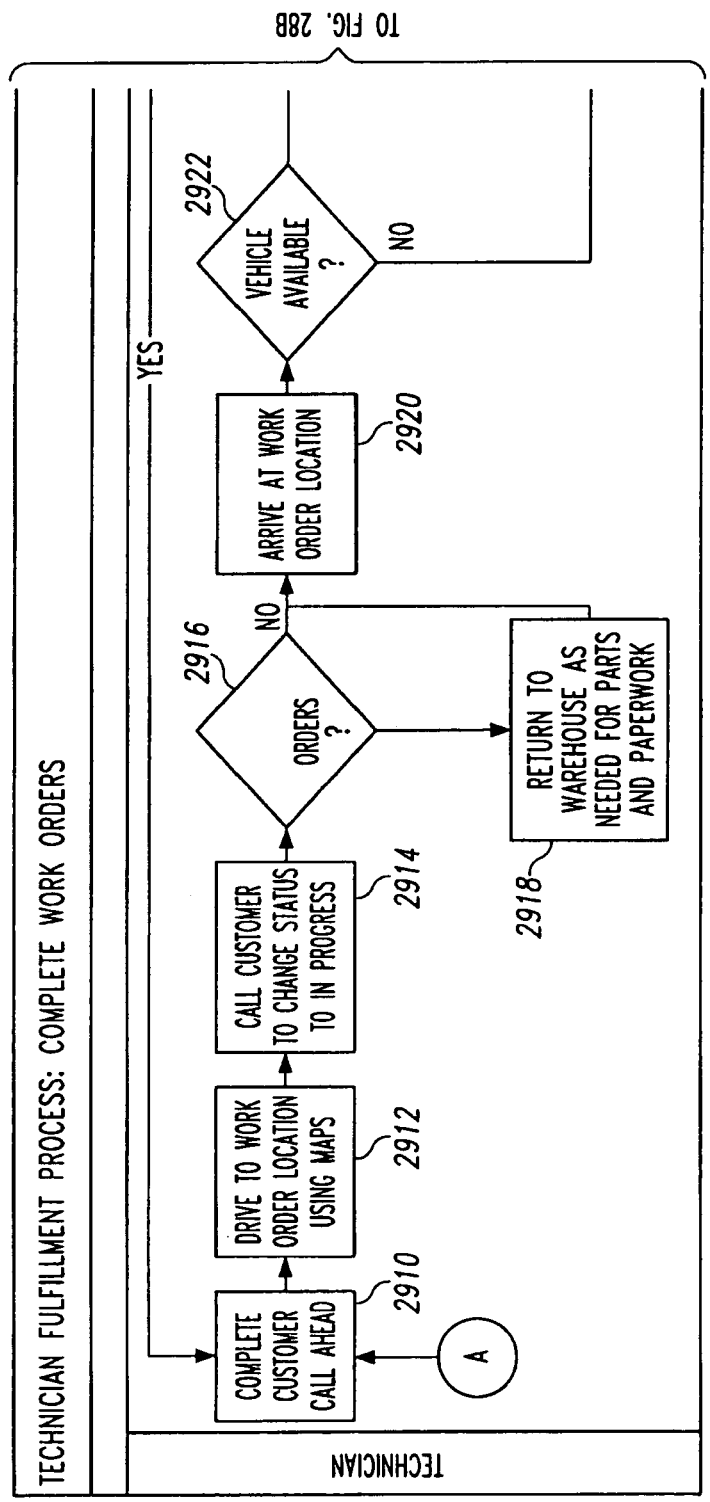
FIG. 29 is a flow diagram of a complete work orders portion of the Technician fulfillment process step of a prior art method for providing location based content delivery services; and, FIG. 30 is a flow diagram of a start of day portion of the technician fulfillment process step of a prior art method for providing location based content delivery services.
Figure 29B:
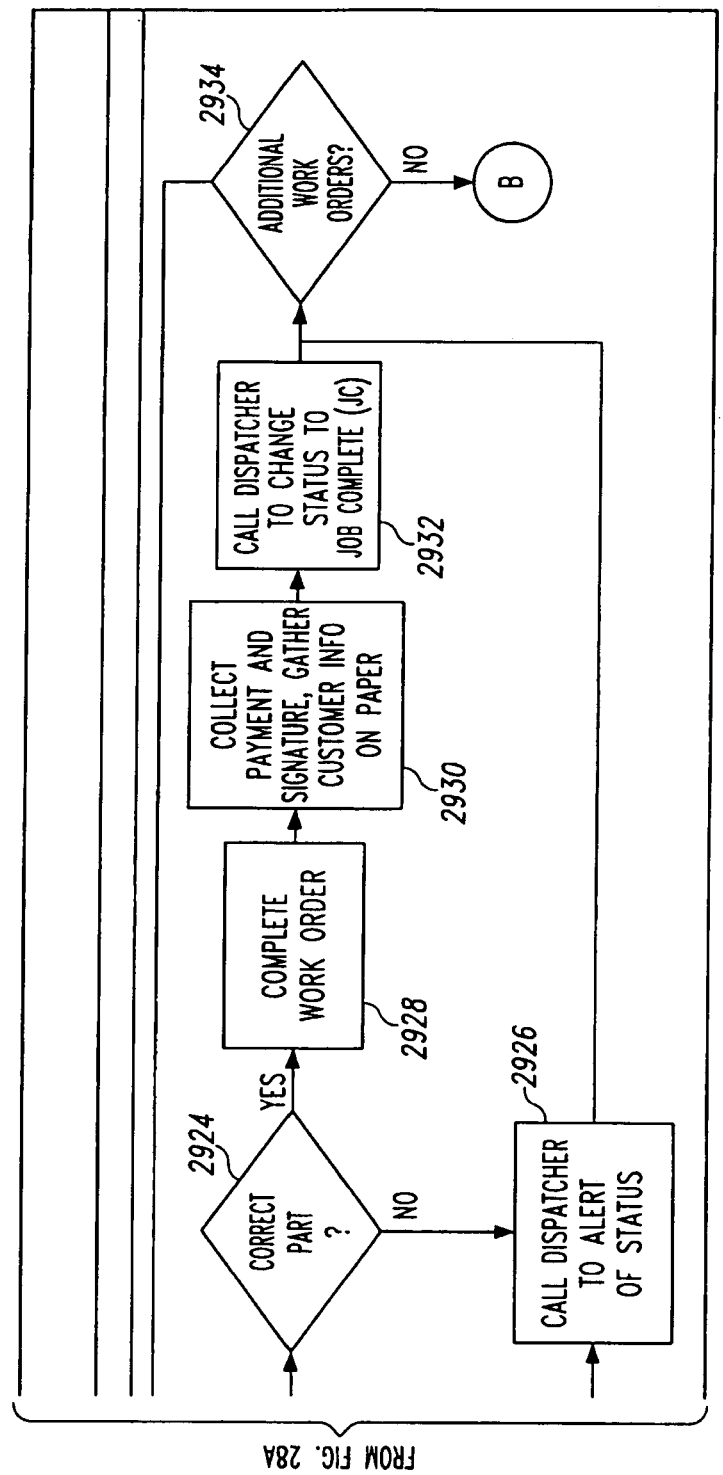
Figure 30:
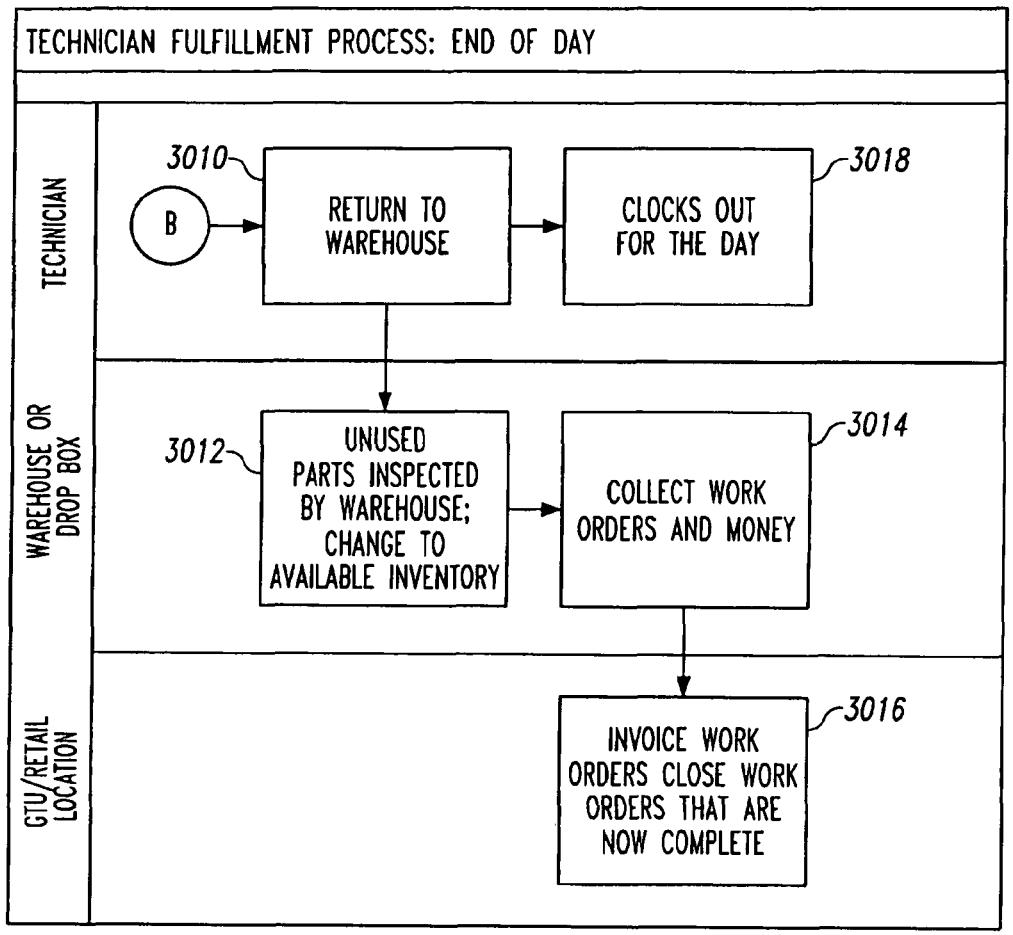

If the technician is already in the field and an add-on work order for a technician is received 2410, the dispatcher enters instructions regarding where to pick up the parts in step 2412. The dispatcher then routes the work order in step 2414 and sends the work order to the appropriate technician's hand-held device 14 in step 2416. The technician's hand-held device 14 receives the new work order in step 2418. The dispatcher prints an updated check-in/check-out sheet in step 2420 and the updated check-in/check-out sheet is sent to the person filling the checkout role in step 2422 and to the warehouse associate in step 2424. The warehouse associate picks the parts and creates a print ticket in step 2426. When the new work order is received by the hand-held device 14 in step 2418, the To Do list is automatically reprioritized and a pop up message may be presented indicating to the technician that a new work order has been assigned to the To Do list. Thus, the disclosed method and device modifies the technician fulfillment process from the prior art technician fulfillment process described in the background and summary section of the application and illustrated in FIGS. 28 through 30.

Figure 25:
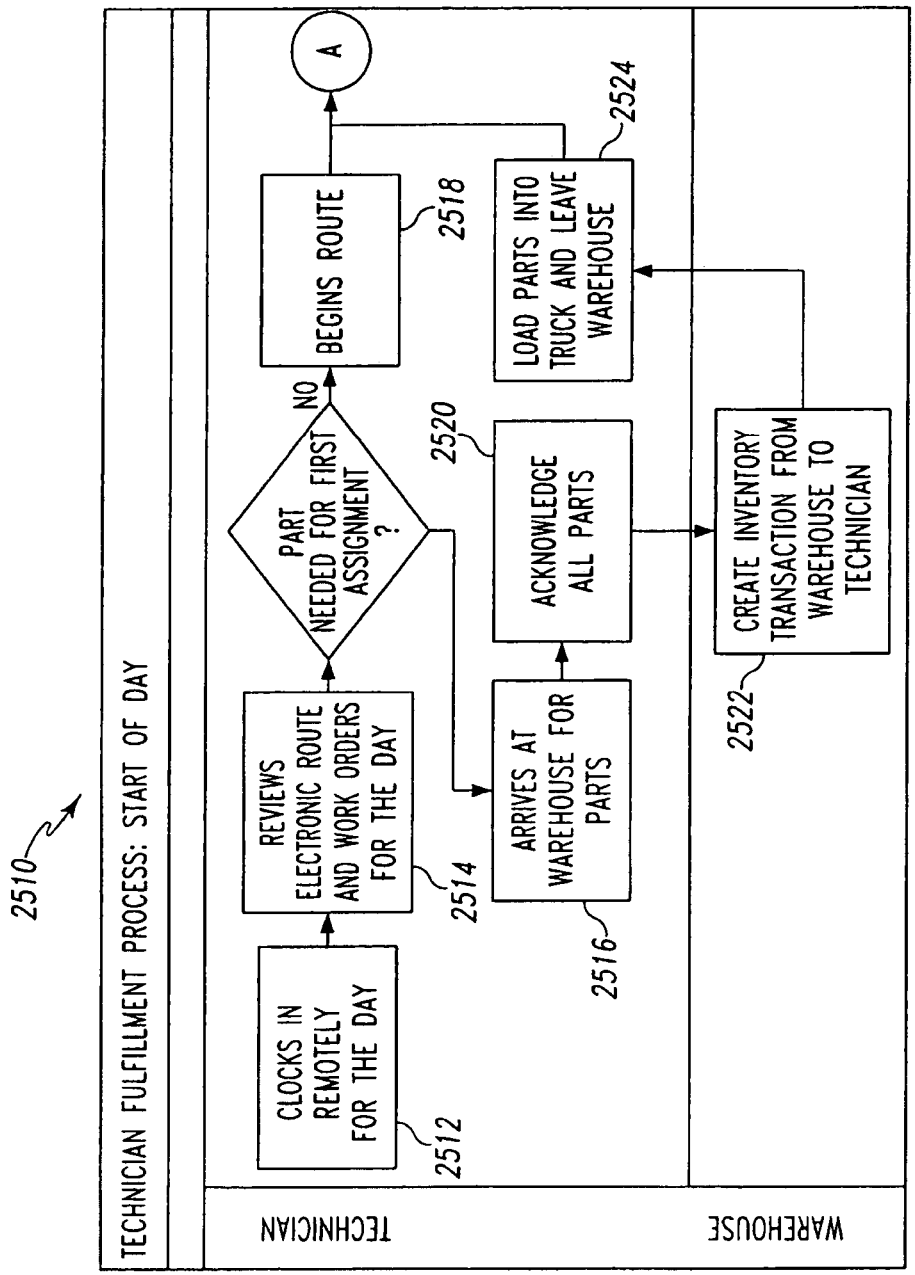
FIG. 25 is a flow diagram of a start of day portion of the technician fulfillment process step of the method for providing location based content delivery services.

Thus, referring to FIG. 25, the start of the day portion of the Technician fulfillment process step 2510 is performed by the technician clocking in remotely using the hand-held device 14 in step 2512. After clocking-in remotely, the technician reviews the electronic route and work orders for the day in step 2514. If it is determined that based on the review of the work orders that parts are needed for the first assignment, the technician arrives at the warehouse for parts in step 2516. The technician then acknowledges all parts to be received from the warehouse in step 2520. The warehouse creates an inventory transaction from the warehouse to the technician in step 2522. Preferably, this inventory transaction is entered into the technology system of the server 12. The technician then assures that the parts required are loaded onto the truck and leaves the warehouse to begin the route in step 2524. If after reviewing the route and work orders, the technician determines that no parts are needed for the first assignment, the technician begins the route from the clock-in location in step 2518. The technician has then completed the start of the day portion of the Technician fulfillment process step 2510 and proceeds to the complete work orders portion of the Technician fulfillment process step 2610.

Figure 26:
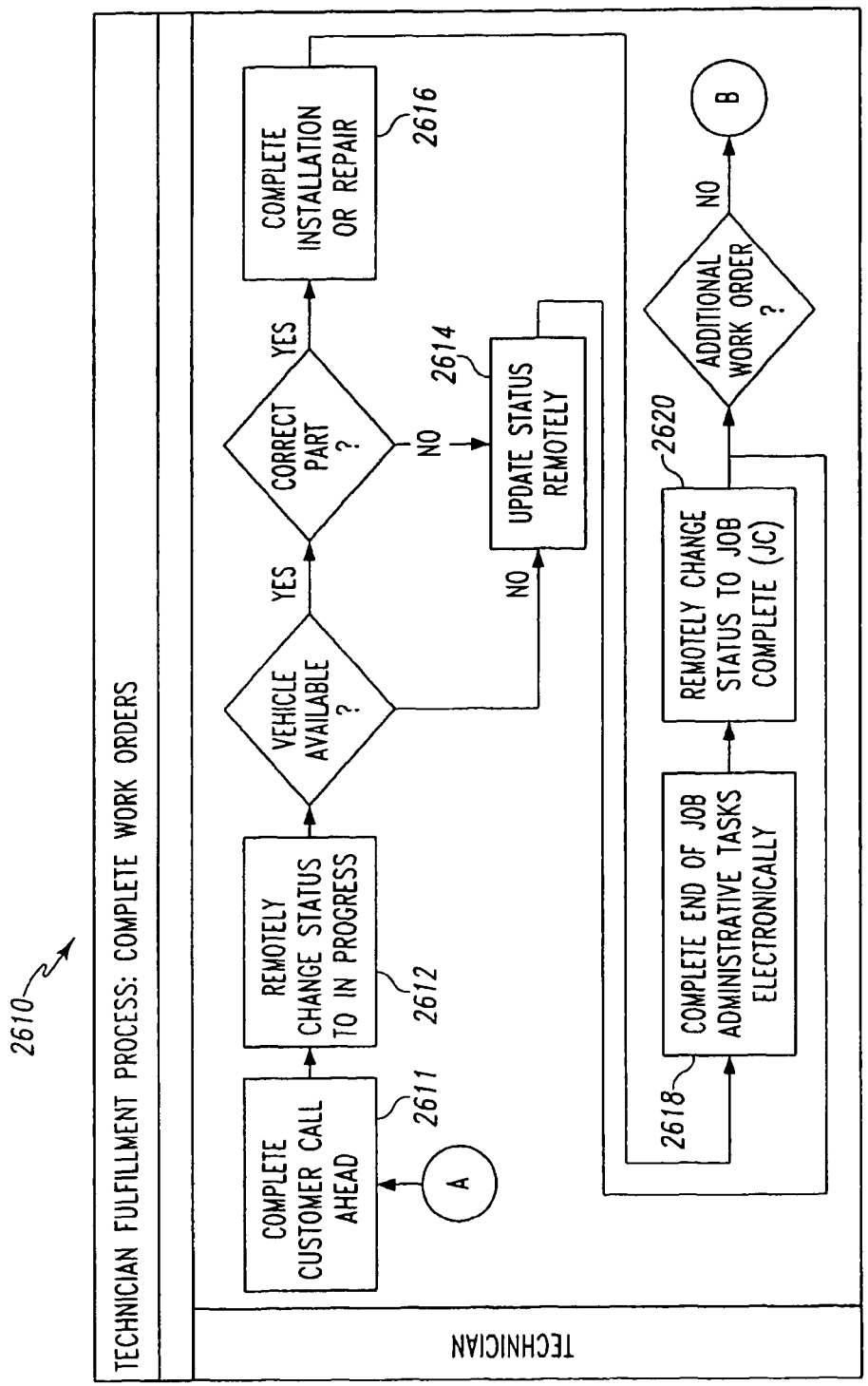
FIG. 26 is a flow diagram of a complete work orders portion of the technician fulfillment process step of the method for providing location based content delivery services.

Referring to FIG. 26, the technician initiates the complete work orders portion of the Technician fulfillment process step 2610 by completing the customer call ahead step 2611. The technician then changes the status of the first work order to be completed, and upon which the call ahead step has been completed, to in progress ("IP") in step 2612 utilizing the hand-held device 14. If the vehicle or the correct parts required for completion of the work order are not available, the technician remotely updates the status of the work order in step 2614 to indicate that the job is no longer in progress and cannot be completed. The update of the job status is transferred remotely from the hand-held device 14 to the technology system of the server 12 so that the dispatcher can access the technology system to re-route the work order. If additional work orders are available on the technicians To Do list, the technician loops back to the complete customer call ahead step 2611 with regard to the additional work order. If the vehicle and correct parts are available, the technician completes the installation and repair in step 2616. After completing the installation or repair on the work order, the technician completes the end of the job administrative tasks electronically in step 2618. Among the tasks included in step 2618 may be such things as gathering a customer signature, tendering, capturing required data to close the work order such as the Vehicle Identification number and credit card information. The technician then remotely changes the status of the work order to "job complete" in step 2620 using the hand-held device 14. Again, if there are additional work orders, and the technician has not completed the assigned hours for the day, the technician then begins the complete work orders portion of the Technician fulfillment process step 2610 again. Also, the technician is automatically alerted when additional work orders not originally assigned to the To Do list are assigned. The route is optimized to reduce the number of required trips to the warehouse and to minimize the mileage traveled to accomplish the remaining jobs in a timely fashion. The inventory is automatically updated each time a work order is completed.

Figure 27:
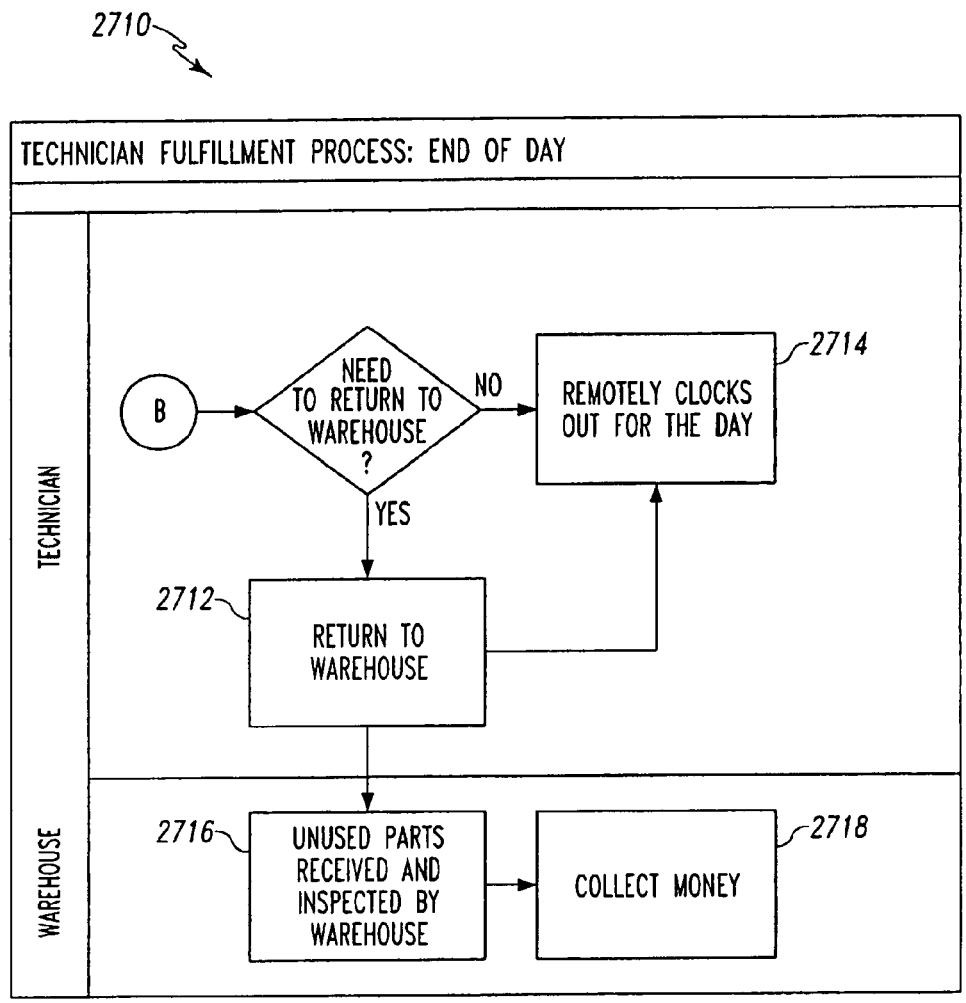
FIG. 27 is a flow diagram of a start of day portion of the technician fulfillment process step of the method for providing location based content delivery services.

Referring to FIG. 27, when the complete work orders portion of the Technician fulfillment process step 2610 is completed, the end of day portion of the Technician fulfillment process step 2710 is performed. Initially the technician determines if there is a need to return to the warehouse, e.g. to return unused parts or tender payments that could not be electronically reconciled. If so, the technician returns to the warehouse in step 2712. At the warehouse, the technician returns unused parts which are inspected by the warehouse in step 2716. Also, assuming the technician collected cash or checks for payment for performance of the work orders, the money is collected in step 2718. After returning parts or tendering money, the technician remotely clocks-out for the day in step 2714 utilizing the hand-held device 14 while at the warehouse. If the technician does not need to return to the warehouse, then the technician can remotely clock-out for the day in step 2714 using the hand-held device 14 at the last work order location or at some other agreed upon location.

While the present invention has been described in detail with reference to certain exemplary embodiments thereof, such are offered by way of non-limiting example of the invention, as other versions are possible. Moreover, a number of design choices exist within the scope of the present invention, some of which have been discussed above. It is anticipated that a variety of other modifications and changes will be apparent to those having ordinary skill in the art and that such modifications and changes are intended to be encompassed within the spirit and scope of the invention as defined by the following claims.

What is claimed is:

1. A system for providing location based content delivery comprising:
    a server located at a first location, the server including memory and data stored in the memory relating to a plurality of requests for services at a corresponding plurality of locations other than the first location;
    a hand-held electronic device located at one location of the corresponding plurality of locations configured for
        communicating via a wireless network with the server to receive a first data relating to a prioritized list of the plurality of requests for services,
        storing the first data in a local database resident on the hand-held electronic device,
        receiving updated data regarding a provision of services for updating the data stored in the memory, and
        determining if a data connection is available to the server and i) transmitting the updated data to the server substantially immediately when the updated data becomes accessible if a data connection to the server is available, or ii) storing the updated data in the local database and automatically transmitting the updated data to the server at a later time when the data connection becomes available; and
    a processing device communicatively coupled to the hand-held electronic device.

2. The system of claim 1 wherein the processing device is configured to automatically capture information regarding an account represented by a credit card and transfer the account information to the hand-held electronic device.

3. A system for providing location based content delivery comprising:
    a server located at a first location, the server including memory and a first data stored in the memory relating to a plurality of requests for services at a corresponding plurality of locations other than the first location;
    a hand-held electronic device located at one location of the corresponding plurality of locations configured for
        communicating via a wireless network with the server to receive the first data relating to a prioritized list of the plurality of requests for services,
        storing such the first data in a local database resident on the hand-held electronic device,
        receiving updated data regarding a provision of services for updating the data stored in the memory, and
        determining if a data connection is available to the server and i) transmitting the updated data to the server substantially immediately when the updated data becomes accessible if a data connection to the server is available, or ii) storing the updated data in the local database and automatically transmitting the updated data to the server at a later time when the data connection becomes available; and
    a processing device communicatively coupled to the hand-held electronic device, wherein the processing device is configured to automatically capture information regarding an account represented by a credit card and transfer that information to the hand-held electronic device, and wherein the processing device includes a credit card swipe slot configured to allow swipe of credit cards in a credit card capture device.

4. The system of claim 2 wherein the processing device is configured to print a document from a printer and wherein the document so printed includes information reflective of data stored in the memory.

5. The system of claim 1 wherein the processing device is configured to print a document from a printer and wherein the document so printed includes information reflective of data stored in the memory.

6. The system of claim 1 and further comprising a signature capture device communicatively coupled to the hand-held electronic device and configured to capture an electronic image file of a signature and to convert that electronic image file into a data format for transferring to the hand-held electronic device as part of the updated data for transmission to the server.

7. The system of claim 6 wherein the processing device is configured to automatically capture information regarding an account represented by a credit card and transfer the captured information to the hand-held electronic device.

8. The system of claim 7 wherein the hand-held electronic device is configured to i) wirelessly communicate with a credit authorization server to receive authorization information from the credit authorization server based on transfer to the credit authorization server of the captured information when such wireless communication is available, and ii) store the captured information and automatically and wirelessly communicate with the credit authorization server to receive authorization information from the credit authorization server based on transfer to the credit authorization server of the captured information at a later time when such wireless communication becomes available.

9. The system of claim 8 wherein the processing device includes a credit card swipe slot configured to allow swipe of credit cards in a credit card capture device.

10. The system of claim 6 wherein the processing device is configured to print a document from a printer and wherein the document so printed includes information reflective of data stored in the memory.

11. The system of claim 6 and further comprising a location information-receiving device configured to display location information on a screen of the hand-held electronic device.

12. The system of claim 11 wherein the location information displayed on the screen of the hand-held electronic device includes directions to the plurality of locations other than the first location of the server at which the corresponding plurality of requests for services for which data is stored in the memory are to be performed.

13. The system of claim 12 wherein the hand-held electronic device transfers location data regarding positions of the hand-held electronic device to the server.

14. The system of claim 13 wherein the location information-receiving device is implemented by the hand-held electronic device.

15. The system of claim 14 wherein the location information-receiving device includes a GPS (global positioning system) receiver configured to receive signals from a global positioning satellite system.

16. The system of claim 1 wherein the location data is transferred in an XML (extended mark-up language) format between the server and the hand-held electronic device.

17. The system of claim 6 wherein the signature capture device transfers the electronic image file to the hand-held electronic device utilizing a Bluetooth connection.

18. The system of claim 17 wherein the electronic image file is transferred in an image file format.

19. The system of claim 18 wherein the electronic image file is transferred in a scalable vector graphics format.

20. A method for providing location based content delivery at a job site other than the location of a service provider comprising:
   providing a technician with a hand-held electronic device;
   clocking the technician in remotely utilizing the hand-held electronic device at location of technician and a computer at the location of the service provider;
   clocking the technician out remotely utilizing the hand-held electronic device at location of technician and the computer at the location of the service provider;
   communicating a plurality of work orders in a prioritized manner to the hand-held electronic device;
   storing the plurality of work orders on a local database on the hand-held electronic device;
   viewing the plurality of work orders on the hand-held electronic;
   capturing customer information electronically on the hand-held electronic device at a job site; and
   determining if a data connection is available to the server and i) transmitting the captured information to a server accessible at the location of the service provider substantially immediately when the captured information becomes accessible if a data connection to the server is available, or ii) storing the captured information in the local database and automatically transmitting the updated data to the server at a later time when the data connection becomes available.

21. The method of claim 20 and further comprising capturing a customer's signature electronically at the job site.

22. The method of claim 21 and further comprising transferring the captured customer's signature to the server as part of the captured information.

23. The method of claim 20 and further comprising remotely updating the status of the plurality of work orders on a server accessible at the location of the service provider wirelessly through the hand-held electronic device.

24. The method of claim 22 and further comprising reprioritizing work orders in real-time by sending the reprioritized work orders to the hand-held electronic device.

25. The method of claim 20 and further comprising obtaining real-time location information of the technician and communicating the real-time location information to the server at the location of the service provider by a location technology device coupled to the hand-held electronic device.

26. The method of claim 20 and further comprising printing documentation regarding work orders at the job site for delivery to customers.

27. The method of claim 20 and further comprising recording payments on the hand-held electronic device at the job site.

28. The method of claim 27 and further comprising wirelessly communicating to transfer information regarding the recorded payments to a server accessible at the location of the service provider when such wireless commotion is available.

29. The method of claim 20 and further comprising invoicing customers utilizing the hand-held electronic device at the job site.

30. The method of claim 24 wherein the work orders are transferred in real-time electronically using CDMA (code division multiple access) or CDPD (cellular digital packet data) or GSM (global system for mobile communications) to the hand-held electronic device prioritized by need for completion.

31. The method of claim 26 wherein the documentation is printed using the hand-held electronic device and a printer wirelessly communicating with the hand-held electronic device.

32. The method of claim 20 and further comprising capturing VIN (Vehicle Identification Number), mileage and license plate information for a customer's vehicle utilizing the hand-held electronic device as part of the captured information.

33. The method of claim 32 and further comprising transmitting wirelessly the captured VIN, mileage and license plate to the server accessible at the location of the service provider without intervention utilizing the hand-held electronic device.

* * * * *